United States Patent [19]
Vander Zalm et al.

[11] Patent Number: 5,870,944
[45] Date of Patent: Feb. 16, 1999

[54] CARBONATED BEVERAGE MAKING APPARATUS AND METHOD

[75] Inventors: William N. Vander Zalm, Delta; Sven O. Tjelta, Mayne Island, both of Canada; Cliford R. Perry, Federal Way, Wash.

[73] Assignee: International Home Beverage Supply Co., Inc., Vancouver, Canada

[21] Appl. No.: 775,355

[22] Filed: Jan. 3, 1997

[51] Int. Cl.$^6$ ........................................................ A23L 2/54
[52] U.S. Cl. .................... 99/323.2; 99/323.1; 261/DIG. 7
[58] Field of Search ................................ 99/323.2, 323.1; 261/DIG. 7

[56] References Cited

U.S. PATENT DOCUMENTS 4,323,090  4/1982  Magi ........................................... 141/70

FOREIGN PATENT DOCUMENTS 2 093 359  9/1982  United Kingdom .

*Primary Examiner*—Marian C. Knode
*Assistant Examiner*—Brenda G. Brumback
*Attorney, Agent, or Firm*—Robert B. Hughes; Hughes & Schacht, P.S.

[57] ABSTRACT

A system of carbonizing water as part of making a carbonized beverage. There is a housing to contain the pressurized bottle of carbon dioxide, and also to define a chamber to receive a container of water. A pressure regulating valve maintains the carbon dioxide discharged from the carbon dioxide container at a predetermined lower pressure and directs the carbon dioxide to a selectively operable pressurizing valve that directs the carbon dioxide through a discharge nozzle into the water in the water container. The water container is closed by a mounting plug that interconnects with a receptacle block that is operably connected to the pressurizing valve, and also operably connected to a venting valve which is selectively operated to vent the remaining pressurized carbon dioxide after the carbonizing has been completed. In several embodiments, there is also provided a vent orifice to continuously vent carbon dioxide from the water container as the carbon dioxide is injected into the water, to obtain more complete carbonization.

31 Claims, 15 Drawing Sheets

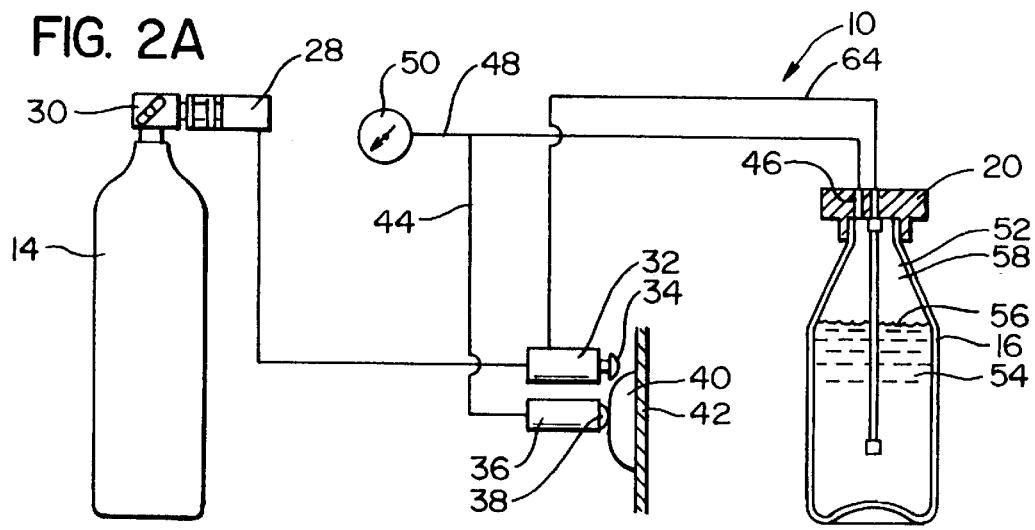
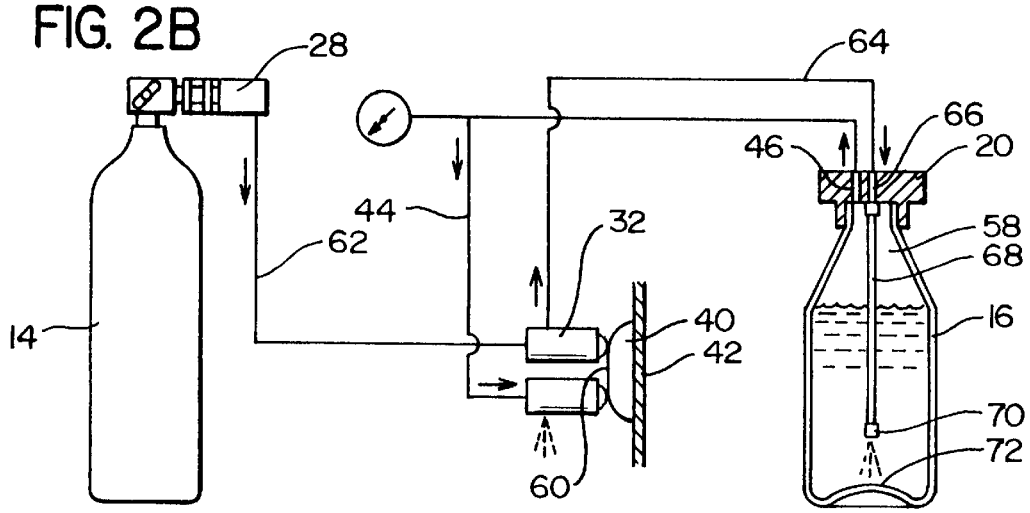
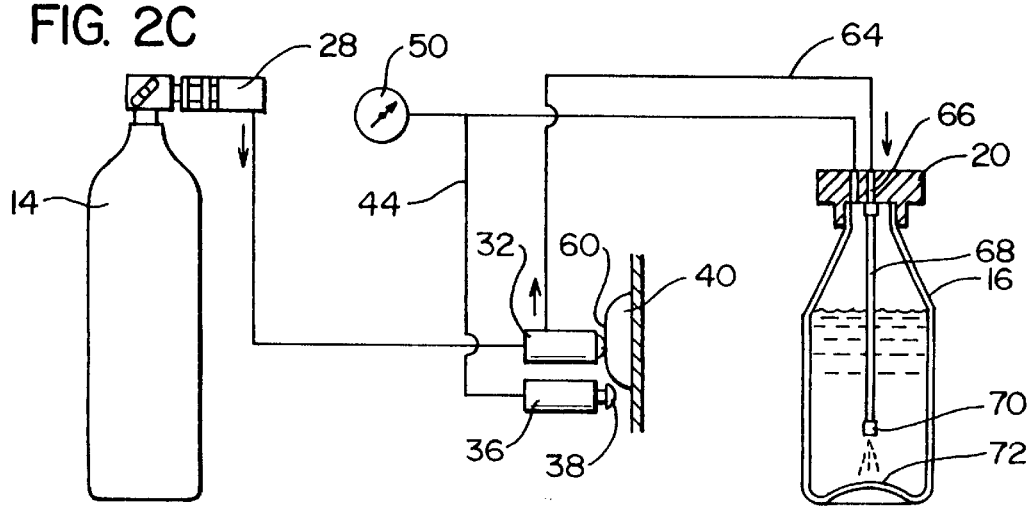

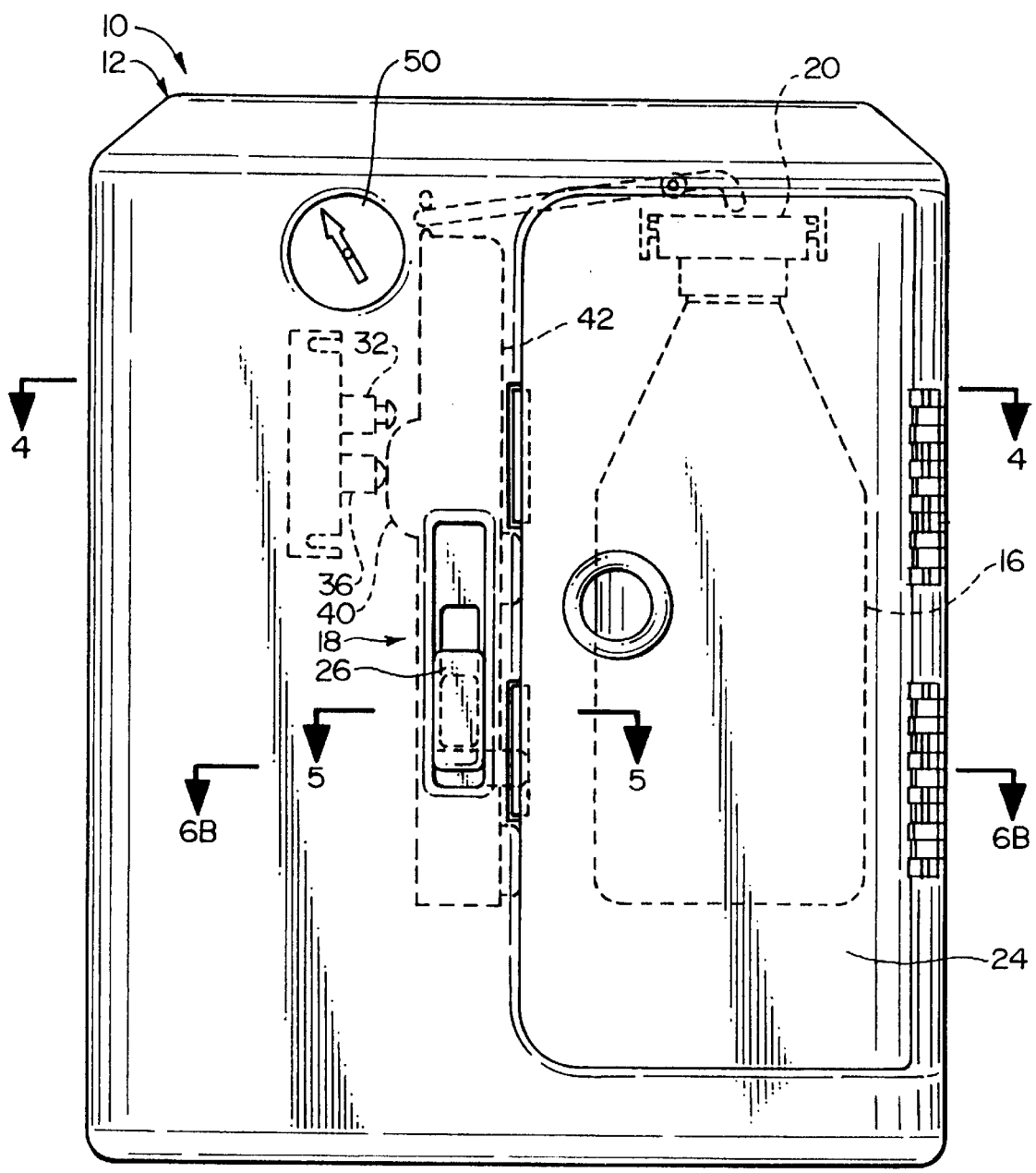

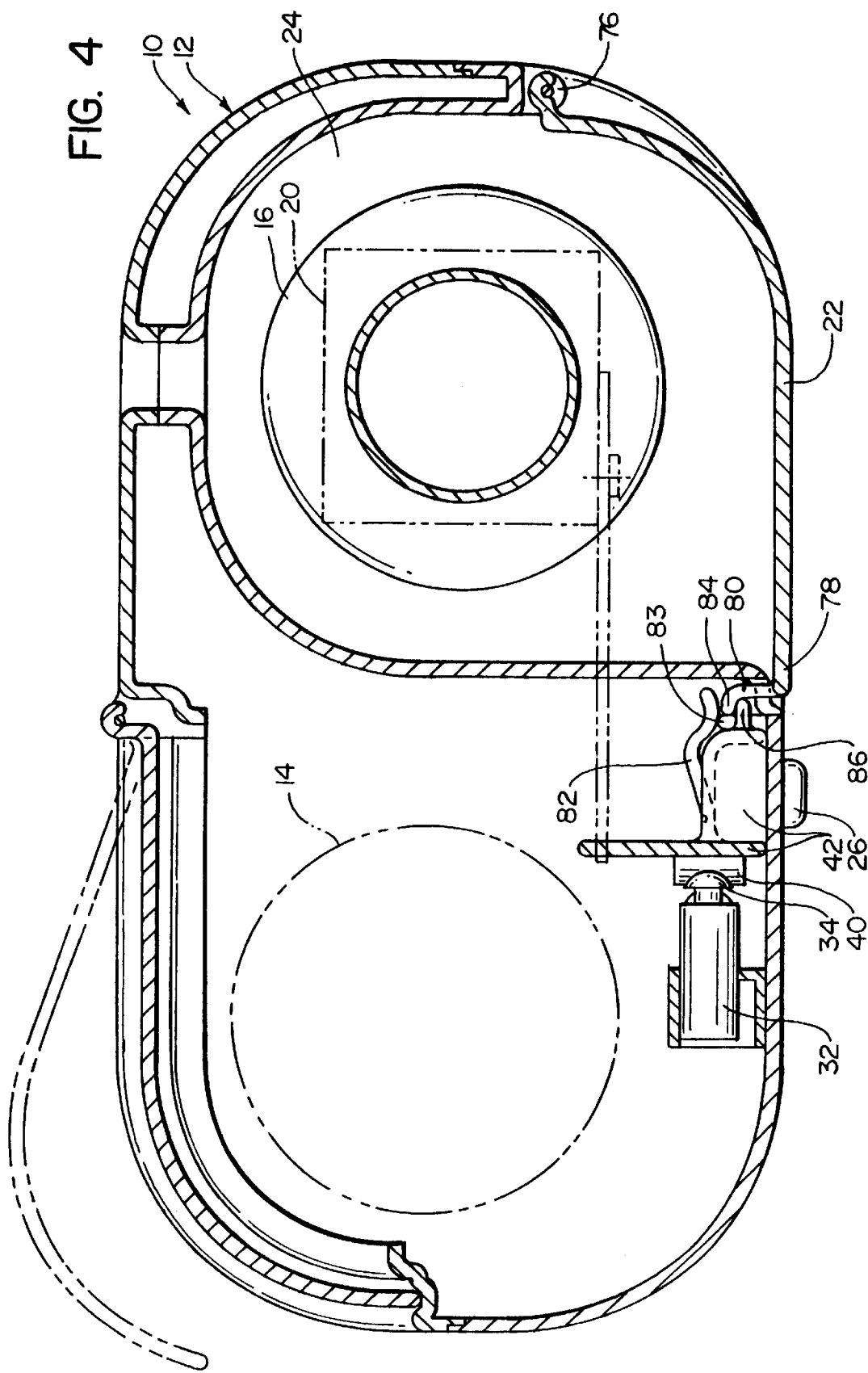

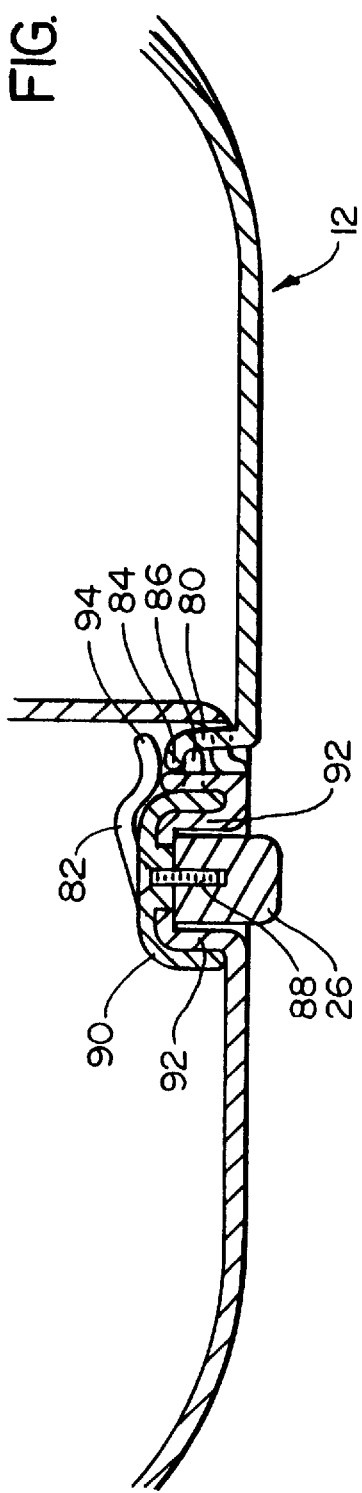

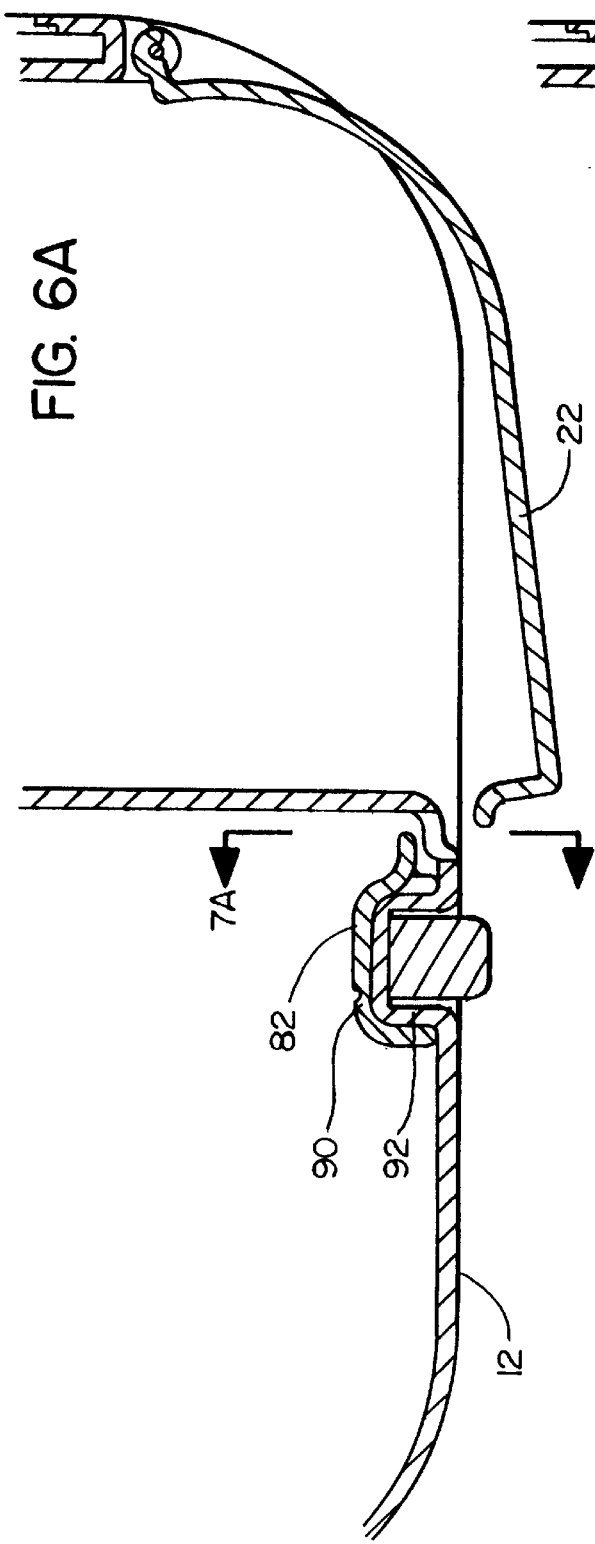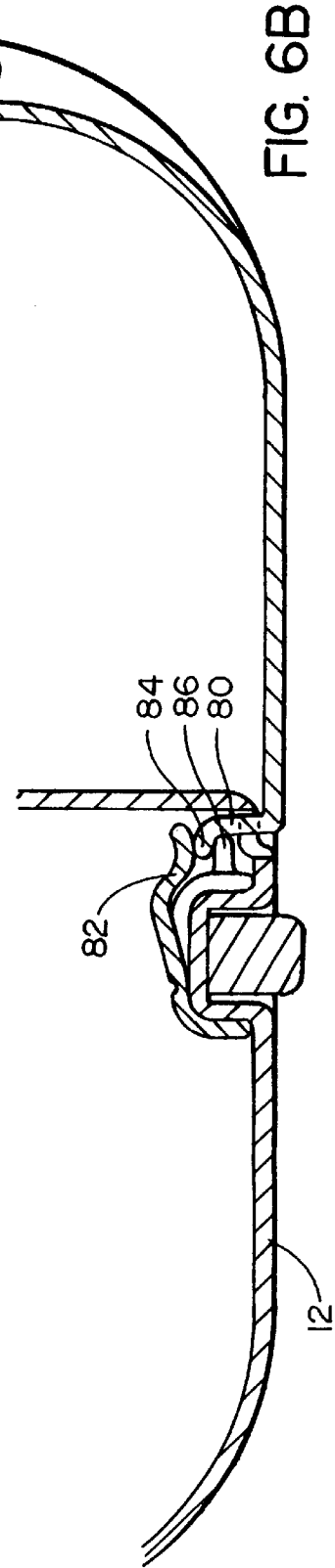

FIG. 7A
FIG. 7B
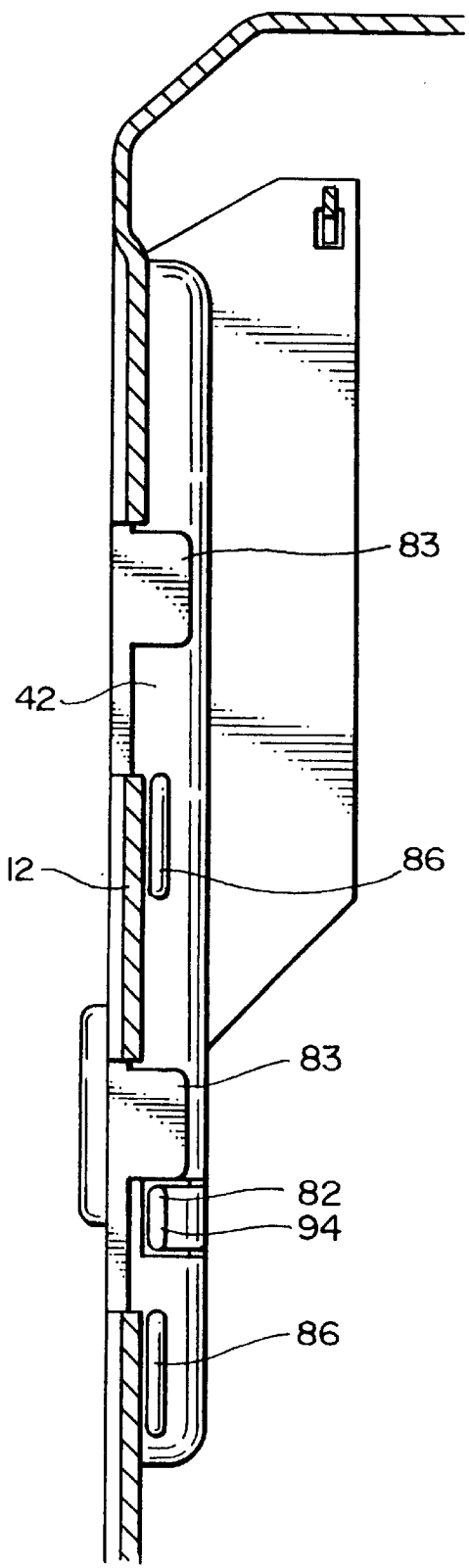
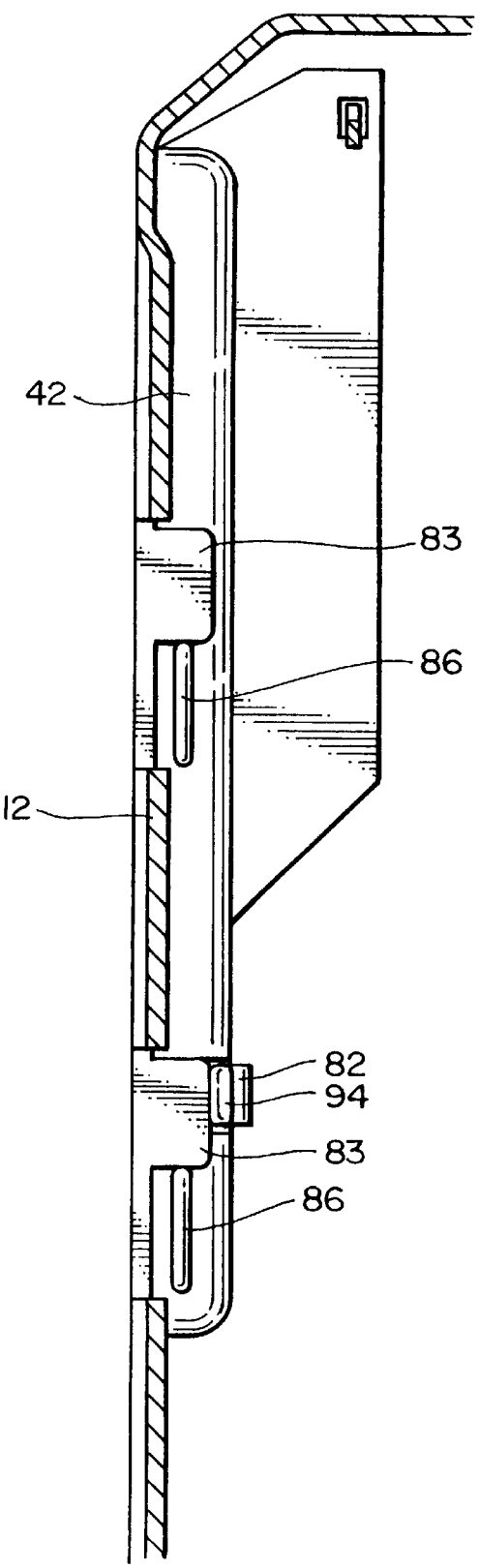

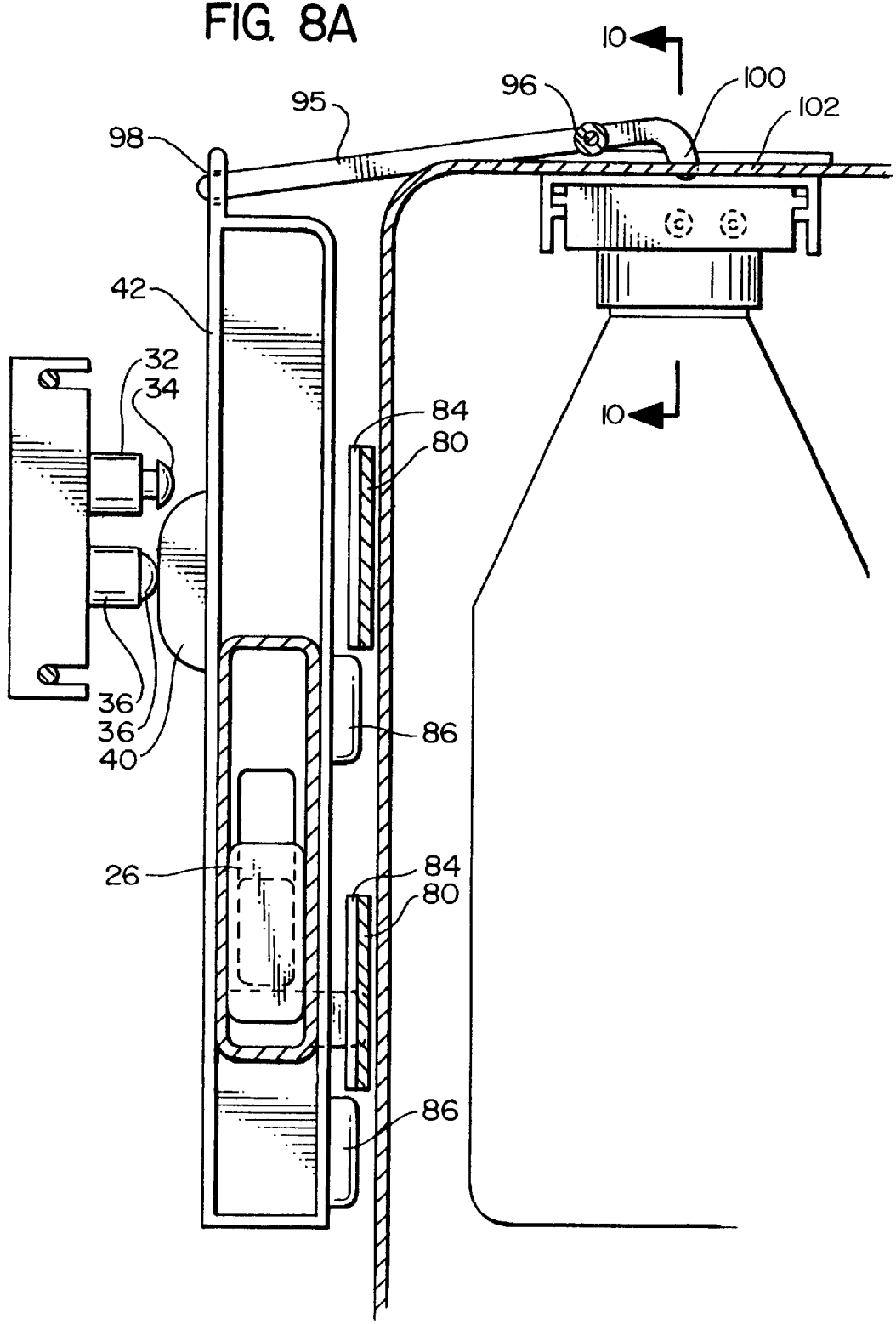

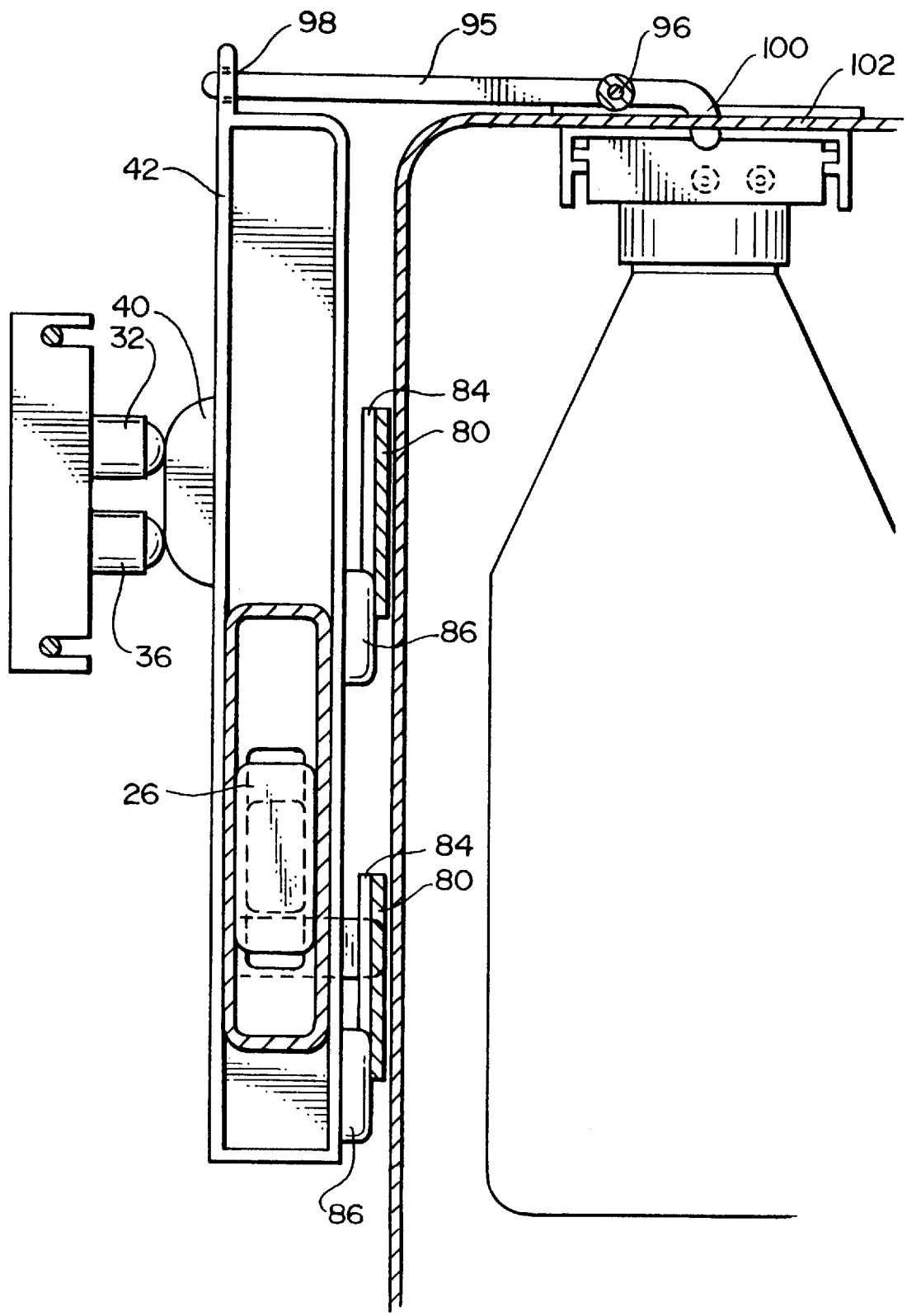

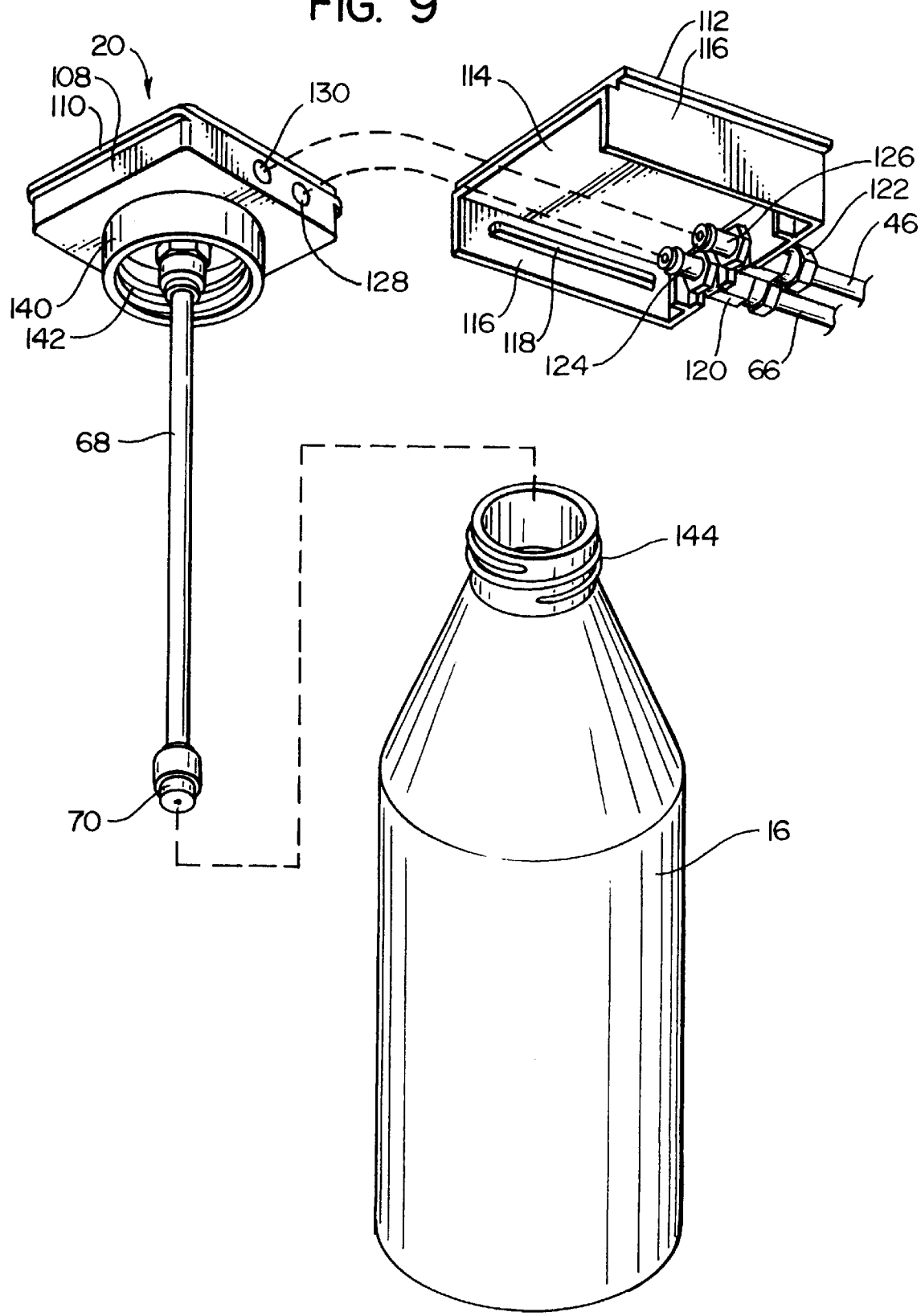

CARBONATED BEVERAGE MAKING APPARATUS AND METHOD

BACKGROUND OF THE INVENTION a) Field of the Invention

The present invention relates to an apparatus and method for carbonating water, more particularly to such an apparatus and method where the carbonating is carried on in a manner that after carbonating, a syrup or other additive can be promptly mixed in with the carbonated water to rapidly provide the carbonated beverage.

b) Background Art

Most often, carbonated beverages are placed in a bottle or can at the place of manufacture. When it is desired to drink the beverage, the person simply opens the can or bottle and then drinks the beverage directly from the can or bottle or from a glass into which it is poured. However, storing these beverage containers in any quantity can be something of an inconvenience for a family, particularly where the beverage is stored in a refrigerator or the like.

Accordingly, there have been designs to provide an apparatus where the water for the carbonated beverage could be carbonized away from the manufacturing location of the beverage. The beverage that is so carbonated could be either stored for later use, or immediately mixed with a syrup to make a flavored beverage, such as a soft drink or a beer, at the time the carbonated beverage is made. Further, some of these designs have been proposed for home use.

A search of the patent literature has disclosed the following:

U.S. Pat. No. 4,548,828 and U.S. Pat. No. 4,481,986 (both issued to Meyers) show a carbonization apparatus where there is a container 18 of water which is placed upside down onto a base 12 so that the end cap on the water container is facing downwardly. A bottle 22 of compressed carbon dioxide is also placed upside down on the container, and positioned upside down on the base, and there is a mechanism for opening the valve on the bottle of carbon dioxide to cause the pressurized carbon dioxide to flow through a passage in the base and through a stem into the container 18. The gas bubbles separately upwardly in the container, and at the base portion of the container (which is now in an upward position), there is a release valve where carbon dioxide can be selectively vented, thus causing more carbon dioxide to flow upwardly through the water, agitating the water and causing yet further carbonization of the water. When the bottle is removed from its position on the base, the cap closes to stop water from leaking. Also, a control valve 56 automatically moves to a closed position to stop further flow of carbon dioxide.

U.S. Pat. No. 4,526,730 (Cochran et al) shows a home carbonating apparatus where a block-like apparatus 10 is threaded onto the top of a beverage container, and a container of carbon dioxide is connected to a passageway in the apparatus 10 to lead to a tube and into the beverage container. In one embodiment, there is a small cartridge which is pierced as it is moved into the block. There is an alternative embodiment where a valve lever opens the pressurized carbon dioxide container.

U.S. Pat. No. 4,399,081 (Mabb) shows an apparatus for aerating liquids where there is a bottle of a compressed gas 7 positioned in a housing. A liquid container is positioned in the housing, and raised by a platform 15 upwardly where it comes into engagement with a seal 16. There is an operating button 9 at the top of the housing which is depressed to open the valve of the pressurized container of gas, causing it to flow through the hollow rod 12 to deliver gas into the liquid contained in the bottle. To remove the bottle from the apparatus there is a cam member 22 which is moved to lower the platform 15, thus permitting the upper part 4 of the housing to be rotated so that the bottle can be removed.

U.S. Pat. No. 4,391,762 (child et al) shows an aerated drink machine where a bottle 10 is positioned in the machine, and there is a member 13 which is inserted downwardly in the neck of the bottle to raise the liquid level in the bottle. A lever 31 is operated to open the valve 29 to cause a gas flow through the member 13 into the liquid so that it bubbles up and escapes through an annular space between the nozzle and an aperture 15a in the stopper. With the member 13 in the bottle containing the liquid, there is very little air left in the bottle, and less of the carbon dioxide is not dissipated.

U.S. Pat. No. 4,342,710 (Adolfsson et al) shows an apparatus for aerating beverages where there is a stand 2 with a space to receive a glass bottle 4. Positioned above the bottle 4 is a bursting protection member 15 which is moved downwardly to enclose the bottle 4, position a dispensing pipe in the bottle, and also to cause a rubber cone seal 20 to close the top of the bottle. There is positioned alongside the bottle a container of carbon dioxide. A valve 11 is operated by an arm 12 to actuate a pin to permit carbon dioxide to flow through the hose 10 into a cylinder space 14 from which the gas flows through the pipe 9 into the container 4.

U.S. Pat. No. 4,304,741 (Abison et al) shows what is called a "gas injection apparatus" for injecting carbon dioxide gas into a bottle 5 to make "fizzy" drinks in the home or other small establishments. There is a platform 4 to support the bottle and a housing member 2 which is pivoted to a base member so that when the apparatus is open, the bottle can be placed upon, or removed from the platform. When the platform is closed, a dip tube 9 penetrates through the opening at the top of the bottle to permit the injection of gas from the cylinder containing the pressurized carbon dioxide. There is a control lever 11 to open the valve of the cylinder and cause the carbon dioxide to flow into the bottle containing the beverage.

U.S. Pat. No. 4,298,551 (Adolfsson et al) shows an apparatus for aerating a beverage where there is positioned within a housing a pressurized bottle containing carbon dioxide and a beverage container. The upper part of the beverage container is closed by a stopper, and there is a flexible diaphragm surrounding the stopper. A space formed above the diaphragm communicates with the interior of the bottle when the bottle has the stopper in its neck. Thus, the pressure of the carbon dioxide in the bottle urges the stopper into the engagement with the neck of the bottle. There is an overpressure safety valve in communication with the space above the diaphragm.

It's an object of the present invention to provide such an apparatus and method which has a desirable balance of features, relative to effectively accomplishing the carbonating, enabling the mixing of the carbonated water with a syrup or other flavoring agent to be accomplished conveniently, and also providing a system that is both safe and reliable.

SUMMARY OF THE INVENTION

The apparatus of the present invention is particularly adapted for making a carbonated beverage. This apparatus comprises a housing structure having a first section at which a pressurized carbon dioxide container can be positioned, and a second section defining a chamber to receive a container with a liquid which is to be carbonated.

There is a pressurized valve means comprising pressure control means to receive pressurized carbon dioxide at a higher pressure level from the source, and reduce the pressure of the carbon dioxide to a predetermined lower level. The pressurized valve means also comprises pressurizing valve means having a closed position and an open position to deliver the carbon dioxide at the predetermined lower level to the second section of the housing structure.

There is a pressurizing nozzle means arranged to be positioned in the second section to receive the pressurized carbon dioxide form the pressurizing valve means and discharge the pressurized carbon dioxide into the liquid in a container in the second housing section.

Then vent valve means are provided, having a closed position and an open position. The vent valve means is arranged to be connected to the liquid container to receive pressurized carbon dioxide form the liquid container.

Also, there is valve actuating means arranged to be moveable between a pressurizing position to open the pressurizing valve to deliver carbon dioxide through the nozzle means, and also a venting position to open the vent valve means to enable pressurized carbon dioxide in the container to flow to a lower pressure area.

In a preferred embodiment, the nozzle means comprises a pressurizing orifice means through which pressurized carbon dioxide is transmitted into the container. There is also vent orifice means defining a vent orifice arranged to be operably connected to the liquid container to receive pressurized carbon dioxide from the liquid container and discharge the carbon dioxide to a lower pressure area. Thus, pressurized carbon dioxide flows through the pressurized orifice means and through the liquid in the container, and at the same time through the vent orifice means.

In one arrangement, the vent orifice means has an effective orifice discharge opening area smaller than an effective orifice discharge opening area of the pressurizing orifice. Thus, the gaseous flow through the vent orifice means is more restricted than the gaseous flow through the pressurizing orifice means, thus causing a relatively greater pressure drop across the vent orifice means and causing pressure in the bottle to rise to a relatively higher level.

In alternative configuration, the effective orifice discharge opening area of the vent orifice means is at least approximately equal to the effective orifice discharge opening area of the pressurizing orifice.

Also, in two embodiments, there is pressure relief check valve means which is operably connected to a passageway interconnecting the vent orifice means with the liquid container. In one arrangement, the pressure relief valve means is connected to carbon dioxide flow from the container to the vent orifice means and in parallel with the vent orifice means to maintain pressure of the carbon dioxide upstream of the vent orifice means below a predetermined upper level. In another arrangement, the pressure relief valve means is operably connected to receive a flow of carbon dioxide from said vent orifice means to maintain a predetermined pressure level of carbon dioxide above atmospheric pressure upstream of the vent orifice means.

Also, in a preferred form, the pressurizing valve portion of the pressurizing valve means, the vent valve means and the valve actuating means are mounted to the housing structure, and the valve actuating means has a first interlock means mounted thereto so as to be moveable with movement of the valve actuating means between the pressurizing position and the venting position. The apparatus is further provided with a door which is moveable to an open position to permit access to the chamber and a closed position closing the chamber. The door has second interlock means which is in an interlock position when the door is closed. The first interlock means is arranged in a manner that when the valve actuating means is in the venting position, the first interlock means and the door interlock means are out of interlocking engagement. When the valve actuating means is moved to the pressurizing position, the first interlock means and the door interlock means come into locking engagement.

Also, there is a valve actuating stop means having a blocking position to prevent movement of the valve actuating means to the pressurizing position. The door is provided with valve actuating release means to remove the stop means from its blocking position to permit the valve actuating means to move to the pressurizing position when the door is closed.

The door has an edge portion which is arranged so that when the door is moved into the closed position, the door edge portion is adjacent to a housing structure portion. The first interlock means and the door interlock means are positioned operably adjacent to the housing structure edge portion and the door edge portion so as to come into interlocking relationship when the door is closed and the valve actuating means is moved to the pressurizing position.

Further, in the preferred form, there is a receptacle block means mounted at the second section of the housing structure. Also, there is a mounting plug means adapted to be removably connected to the liquid container. The receptacle block means has operative connections to the pressurizing valve means and the vent valve means. The mounting plug means is arranged to be moved into operative engagement with the receptacle block means, and the plug means has passageway means interconnecting with the pressurizing valve means and the vent valve means when in the engaged position with the receptacle block means. Thus, the pressurizing valve means and the vent valve means can be in operative engagement with the liquid container when the liquid container is positioned in the chamber and the plug member, connected to the liquid container, is in interconnecting engagement with the receptacle block means.

The receptacle block means is connected to the pressurizing valve means through a pressurizing tube means, and the vent valve means is connected through a venting tube means to the receptacle block means. The mounting plug means has an injection tube means extending from the mounting plug means so as to be positioned at a lower location in the container when the mounting plug means is in interconnecting relationship with the container. The mounting plug means and the receptacle block means have interconnecting passageway connecting means which come into engagement when the mounting plug means is interconnected with the receptacle block means. Thus, pressurized gas can flow from the pressurizing tube means to the receptacle block means and mounting plug means and through the injection tube means to discharge carbon dioxide into the container, and gas in the liquid container can flow through the interconnecting passageway and to the vent valve means. Also, as a further improvement, the valve actuating means has liquid container interlock means arranged so that when the valve actuating means is in the pressurizing position, the container interlock means comes into operative engagement with the container, with the mounting plug means mounted thereto, to retain the liquid container in the chamber.

In the method of the present invention, there is provided a housing structure such as indicated above. The pressurizing nozzle means is positioned in the liquid container in the chamber. Then the pressurizing valve means is operated to deliver the carbon dioxide at the predetermined lower level to the nozzle means and into the liquid container. The vent valve means is then moved to an open position to enable pressurized carbon dioxide in the container to flow to a lower pressure area.

Other features of the present invention will become apparent from the following detailed description.

BRIEF DESCRIPTION OF THE DRAWINGS

FIGS. 2A, 2B and 2C are somewhat schematic drawings, showing the sequence of operation of the present invention;

FIG. 3 is a front isometric view of the apparatus of the present invention;

FIG. 4 is a sectional view taken along line 4—4 of FIG. 3;

FIG. 5 is a sectional view taken along line 5—5 of FIG. 3;

FIGS. 6A and 6B are two sectional views showing the door of the apparatus in first its open position and then in it closed position, this view being taken along the line 6B—6B of FIG. 3;

FIGS. 7A and 7B are longitudinal sectional views showing the valve actuating mechanism and door interlock mechanism in two different positions;

FIGS. 8A, 8B and 8C are sectional views taken along a vertical plane parallel to and just behind the front of the housing of the apparatus, showing in sequence the operation of the valve actuating mechanism;

FIG. 9 is an exploded view showing the water container, the venting and injection lid assembly, and the lid mounting assembly, and illustrating in broken lines the manner in which these can be assembled;

DESCRIPTION OF THE PREFERRED EMBODIMENT

It is believed that a clearer understanding of the invention will be obtained if there is first described the main components of the present invention and its mode of operation. This will then be followed by a more detailed description of the present invention.

Figure 1:
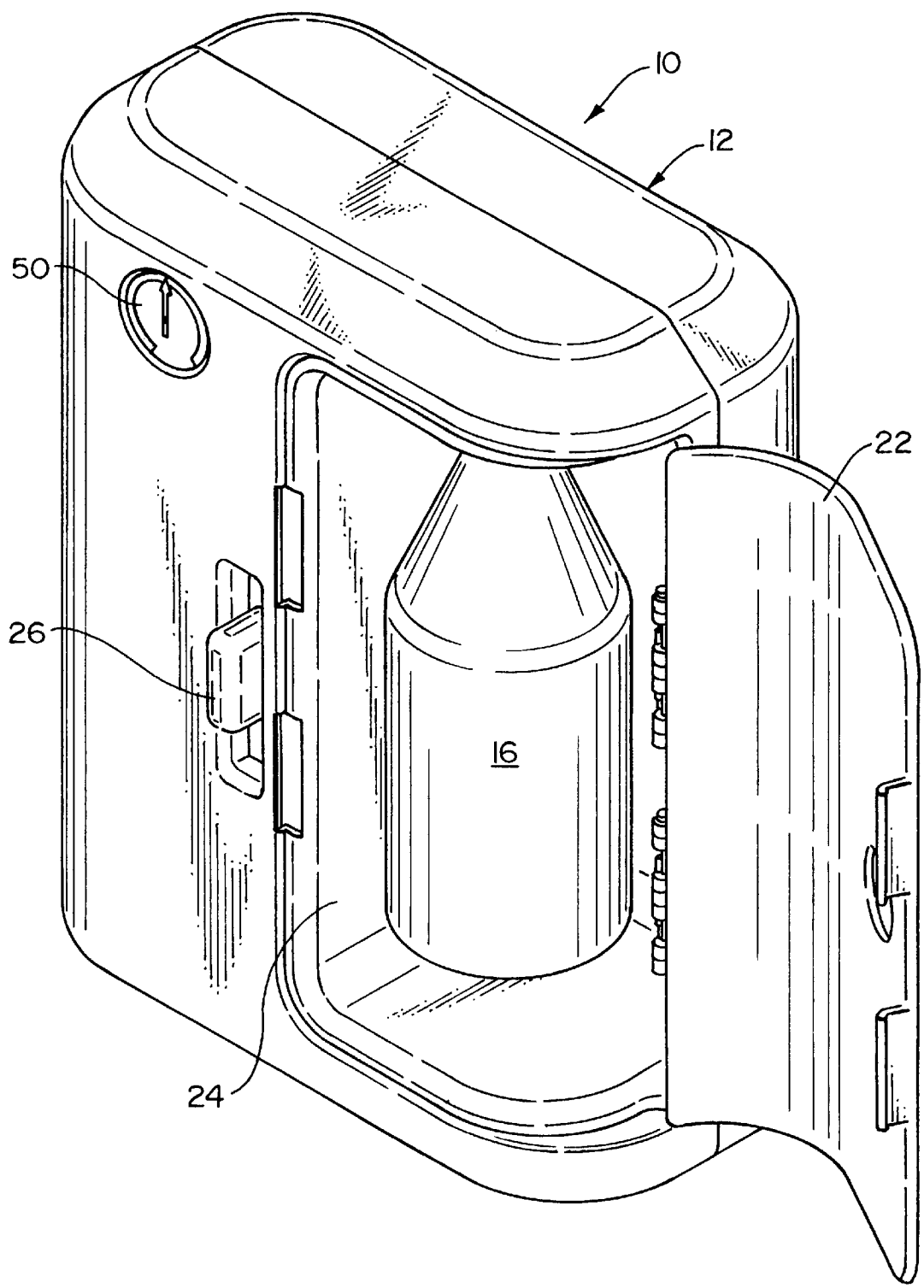
FIG. 1 is an isometric view of the apparatus of the present invention.

The apparatus 10 of the present invention comprises an outer housing 12, a pressurized carbon dioxide container 14, a water container 16, a valve assembly 18, and a carbon dioxide lid and injector assembly 20. In FIG. 1, the water container 16 is shown mounted within the housing 12, with the door 22 of the housing 12 being open. FIGS. 2A through 2C show the main components listed above in somewhat schematic fashion, and show the sequence of operation.

To describe the overall operation of the present invention, the container 16 is filled with water up to a predetermined level, and the container is then placed in an injecting chamber 24 where the injection of the pressurized carbon dioxide is to take place. The door 22 is then closed, and an actuating knob 26 of the valve assembly 18 is raised to start the carbon dioxide injection process. As will be disclosed more fully later herein, this raising of the actuating knob 26 and the subsequent lowering of the same performs a number of functions. More specifically, it provides for the pressured carbonating to take place, the subsequent venting of the bottle to reduce its pressure, and also provides interlock and safety features which will be described more fully later herein.

After the carbonating process is completed (this could take, for example, about 10 to 20 seconds), the knob 26 is lowered, the door 22 is opened, and the container 16 is removed from the injection chamber 24. Then the carbon dioxide lid and injector assembly 20 is unscrewed from the container 16, and at that time a conventional cap can be screwed onto the container 16. Alternatively, a syrup (e.g. a soft drink syrup or a beer syrup) can be poured into the upper part of the container after which the conventional cap is screwed onto the container 16. The container 16 can then be gently inverted and returned to the upright position several times to mix the syrup with the carbonated water, and the carbonated beverage is ready to be consumed.

The obvious advantage of this apparatus is that a carbonated beverage can be made in a very short time (in the matter of a half a minute or so), and it is not necessary to store the full liquid containers. Rather the syrup alone (the volume of which is only a small fraction of the water in which it is mixed) can be stored in syrup containers and used as desired.

To describe in more detail the operation of the present invention, reference is now made to 2A, 2B and 2C. As indicated previously, these are schematic drawings showing sequentially the mode of operation.

FIG. 2A shows the situation where the container 16 has been placed in the injection chamber 24, and the door 22 has been closed. There is a pressure control valve 28 which is connected to the cap 30 of the pressurized carbon dioxide container 14. The pressure in the container 14 could be as high as, for example, 1800 to 2000 PSI. The pressure regulating valve 28 reduces the pressure flow from the container 14 to a constant 200 PSI.

The valve assembly 18 comprises the aforementioned pressure control valve 28, a pressurizing valve 32 having an actuating ball element 34, also a venting valve 36 having its related actuating ball member 38, and a valve actuating means 39. The valve actuating means 39 comprises the aforementioned actuating knob 26 and an actuating cam 40 which is connected to a vertically moveable actuating member 42 (shown only schematically). The aforementioned actuating knob 26 is fixedly connected to the actuating member 42. Also, in terms of function the pressure control valve 18 and the pressurizing valve 32 can be considered to comprise a pressurizing and pressure control valve means, while the pressurizing valve 32 and the vent valve 36 can be considered as a pressurizing and venting valve means.

In the position of FIG. 2A, the actuating knob 26 is in its lower position so that the cam member 40 is positioned so that it bears only against the venting valve member element 38 so that the valve element 36 is in its venting position. The cam member 40, in its lower position, is not in engagement with the pressurizing valve element 34, so that this pressurizing valve 32 remains closed.

The venting valve 36 connects through a line 44 to a vent opening 46 in the lid portion of the aforementioned carbon dioxide lid and injector assembly 20. The line 44 in turn connects through a branch line 48 to a pressure gauge 50. In this condition, with the pressurizing valve 32 being closed, and with the venting valve 36 being open, pressure in the container interior 52 remains at atmospheric. It will be noted that the water 54 in the chamber 52 is at a level 56 that is a short distance below the lid 20 so that there is an upper liquid free area 58. In the position of FIG. 2A, the apparatus 10 is ready to have the pressurized carbon dioxide from the container 14 injected into the water 54.

The initiating of the carbonating step is accomplished simply by raising the actuating knob 26 upwardly which in turn raises the actuating member 42 with its cam 40 upwardly. FIG. 2B shows the actuating member 42 in an intermediate position where the cam member 40 is moving upwardly to a position where the flat cam surface 60 has depressed both of the valve actuating members 34 and 38. At this instant, the venting valve 36 remains open (as it was in the position of FIG. 2A), but in addition the pressurizing valve 32 also moves to its open position.

As indicated previously, the pressurized carbon dioxide in the container 14 first passes through a pressure reduction valve 28 to regulate the pressure at a constant 200 PSI. The pressurized carbon dioxide flows through the line 62 through the pressurizing valve 32 which is now open, thence through the line 64 to pass into the pressurizing opening 66 in the lid and injector assembly 20. The pressurized carbon dioxide moves through the pressurizing opening 66 downwardly through an injection tube 68 which is fixedly connected to the lid and injection assembly 20. The carbon dioxide exits from the tube 68 through a lower end nozzle 70 which is spaced a short distance upwardly from the bottom 72 of the container 16. The nozzle 70 has a single discharge orifice of a relatively small diameter, so that the carbon dioxide is discharged as a very fine gaseous spray. The carbon dioxide bubbles flow upwardly in the water 54 to give the water a somewhat milky appearance.

It was noted that in this intermediate position of FIG. 2B, both the pressurizing valve 32 and the venting valve 36 remain open for a very short time. Thus, as the carbon dioxide flows into the container 16, thus pressurizing the interior, the increase in pressure causes some of the air that is in the upper part 58 of the chamber upwardly through the vent opening 46. In actual practice, the knob 26 would be raised rather rapidly in one motion, so that the position of FIG. 2B occurs in just a fraction of a second.

When the actuating member 42 reaches its upper limit of travel, as shown in FIG. 4C, the actuating surface 60 of the cam member 40 has moved out of engagement with the actuating member 38 of the venting valve 36 to permit the actuating venting valve member 38 to move out to its position to close the vent valve 36. With this occurring, the pressurizing carbon dioxide continues to flow through the line 64 through the nozzle 70 into the beverage container chamber 52 so that the carbon dioxide continues to be discharged into the water 54, with the pressure inside the container 16 continuing to rise.

In about fifteen seconds or so sufficient carbon dioxide has been injected into the water 54 in the container 16 so that the pressure inside the container is at the 200 PSI level to balance the pressure at the outlet end of the pressure control valve 28 on the carbon dioxide container 14. At this time, the flow of carbon dioxide into the container 16 has stopped. This is reflected at the pressure gauge 50 which is connected to the vent opening 46. The person operating the apparatus 10 could either observe the pressure gauge 50 to recognize that the pressure is balanced and the carbon dioxide has stopped flowing, or possibly a signal device, such as a chime or buzzer, could be actuated by the pressure gauge 50 to signal that the desired pressure has been reached, with the carbonating of the water 54 being completed.

When the desired amount of carbon dioxide has been injected into the container 16 which is now at about 200 PSI, the actuating member 40 is moved downwardly. Thus, the cam member 40 will first move downwardly to the position of FIG. 2B. At this time, the venting valve 36 opens, by its actuating member 38 being depressed, and when the actuating member continues to be moved further downwardly to the position of FIG. 2A, the venting valve 36 remains open, while the pressurizing valve 30 is closed. The result of this is that the carbon dioxide that is in the upper empty container portion 58 and whatever air might remain simply vent out through the passageway 44 and outwardly through the venting valve 36 to atmosphere. Then the door 22 is opened, and the container 16 (still connected to the lid and injector assembly 20) is removed from the injecting chamber 24. The lid and injector assembly 20 is unscrewed from the container 16. As indicated previously, a conventional cap could then be placed over the opening of the container 16 to maintain the water 54 as carbonated. Alternatively, a syrup could first be poured into the container opening and then mixed with the carbonated water 54 by turning the container 16 to an inverted position and back to its upright position several times. The carbonated beverage in the container 16 could then be stored or consumed.

As indicated previously, one of the objects of the present invention is to provide for the reliable and safe operation of the apparatus 10. This is accomplished by an interlock system 74 which is incorporated with the actuating member 42 of the valve assembly 18 and also in the door 22. This interlock system 74 is arranged so that with the door 22 open, the valve actuating member 42 cannot be raised to open the pressurizing valve 32. But when the door 22 is closed, the valve actuating 42 can be raised, and at the same time the door 22 is locked shut until the valve actuating member 42 is lowered. These will now be described with reference to FIGS. 3 through 7A–B.

Reference is first made to FIG. 4 which shows the door 22 in its closed position, with the container 16 and lid assembly 20 attached thereto being positioned within the injecting chamber 24. The door 22 is hinge mounted at 76 to the housing 12. The swing end 78 of the door 22 has a "J" shaped locking and release arm 80 mounted at the swing end. This arm 80 accomplishes two functions. First, it moves a release arm 82 a short distance rearwardly to a release position to permit the upward movement of the valve actuating member 42, so that the release arm 82 is able to pass by a stationary stop member 83 mounted to the housing 12. Also, an end finger 84 of the arm 80 causes the door 22 to be locked in its closed position when the actuating member 42 is raised so that a laterally extending locking finger 86 that is mounted to the actuating member 42 moves upwardly into engagement with the finger 84.

Also, when the actuating member 42 is moved upwardly, the interlocking member 86 comes into abutting engagement with the member 83 to limit the upward travel of the actuating member 42.

It can be seen in FIG. 5 that the actuating knob 26 is connected by two or more screw members 88 to a U shaped frame member 90 of the actuating member 42 which in turn is constrained to move against inwardly extending walls 92 of the valve housing 12.

To review briefly how this interlocking and release mechanism works, reference is now made to FIG. 7A and 7B. In FIG. 7A, the actuating member 42 is in its down position. The door 22 has not been closed. Thus, the retaining and release finger 82 remains in its forward position where its finger portion 94 is immediately below the stop member 83. In this position, the actuating member 42 cannot be raised. This, therefore, prevents the inadvertent raising of the actuating member 42 when the door 22 is open, so as to prevent the actuating member 42 inadvertently being lifted to open the pressurizing valve 32.

When the door is closed, then the release finger 82 is moved rearwardly. Thus, when the actuating member 42 is raised, as shown in FIG. 7B, the finger portion 94 passes behind the stop member 83.

Also, it will be noted that when the actuating member is raised to the position of FIG. 7B, the two interlocking members 86 come into engagement with the two stop members 83 that are attached to stationary structure so as to stop further upward movement of the actuating member 42. As indicated previously, in the position of FIG. 7B, the interlocking members 86 come into engagement with the finger 84 of the arm 82 to prevent opening of the door 22. Thus, when the actuating member 44 is in its up position so that the pressurizing valve 82 is open, the door cannot be opened. The actuating member 42 must be moved to its down position, thus closing the pressurizing valve 32 before the door 22 can be opened.

Figure 8C:
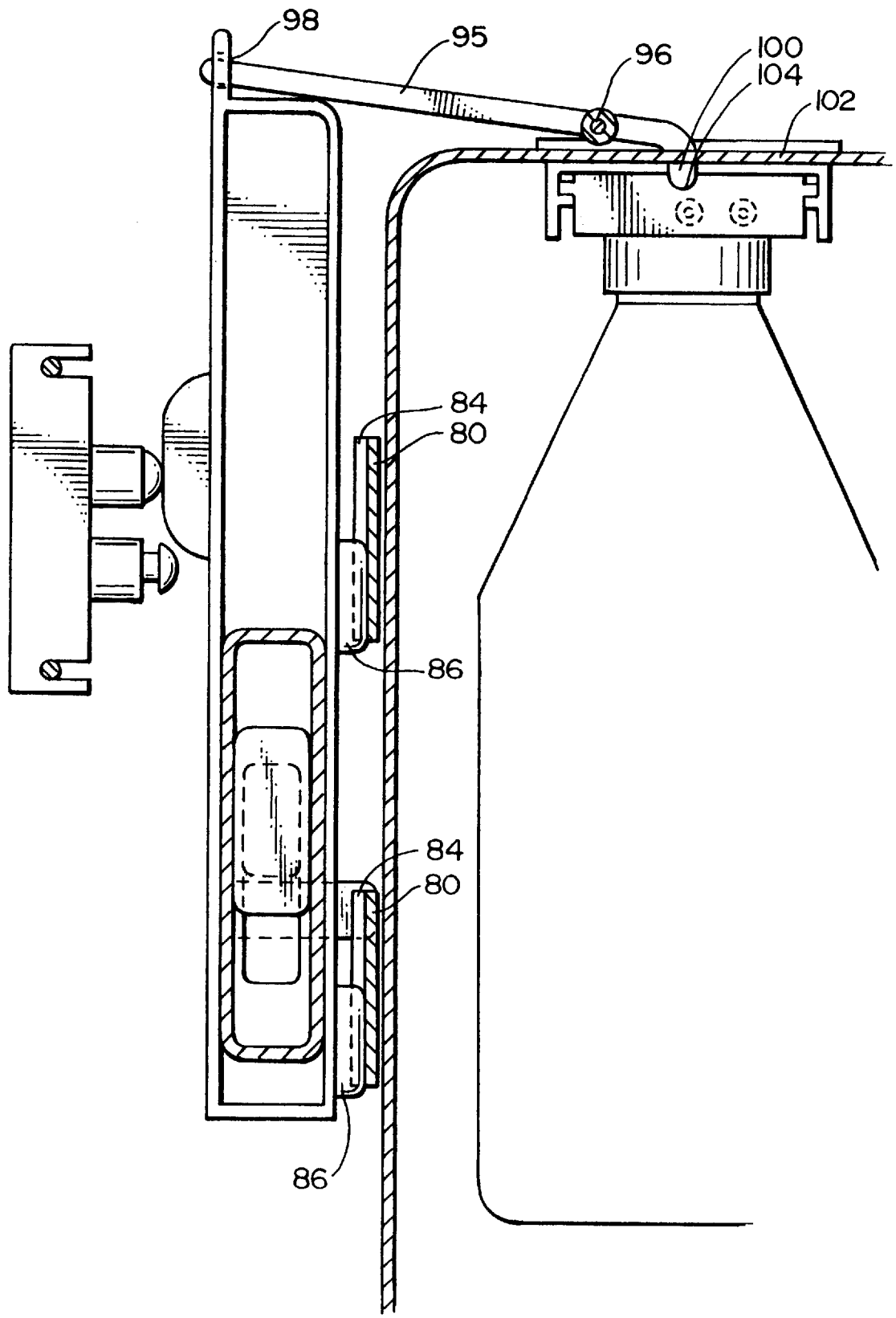

The operation of this interlocking mechanism can further be seen in FIGS. 8A, 8B and 8C, where in the lower position of FIG. 8A, the stop members 86 are disengaged from the lips 84 of the two "J" arms 80. In the position of FIG. 8B, the interlocking members 86 are coming into locking engagement, and this engagement is complete in FIG. 8C.

Another locking mechanism is shown with reference to FIGS. 8A, 8B and 8C. It can be seen that there is an upper locking arm 95 which is pivotally mounted at 96 to the housing 12. The left end of the arm 95 has a pivot connection at 98 to the upper end of the actuator 42, and the opposite end of the arm 95 has a downwardly extending locking finger 100. This finger 100 reaches through an opening in an upper housing wall portion 102 that defines the upper part of the chamber 24.

With the actuating member 42 in its down position as shown in FIG. 8A, the finger 100 is positioned upwardly to be in its non-engaging position. Then, when the actuating member 42 is raised by moving the knob 26 upwardly, the arm 95 swings in a clockwise direction to move the finger 100 into engagement with a matching recess 104 in the lid portion of the lid and injector assembly 20. This is another safety factor in that when the actuator 42 is raised so as to open the pressurizing valve 32, the lid assembly 20 and the container 16 remain in place so that the flow path of the pressurized carbon dioxide is compelled to flow through the assembly 20 and into the container 16.

Figure 10:
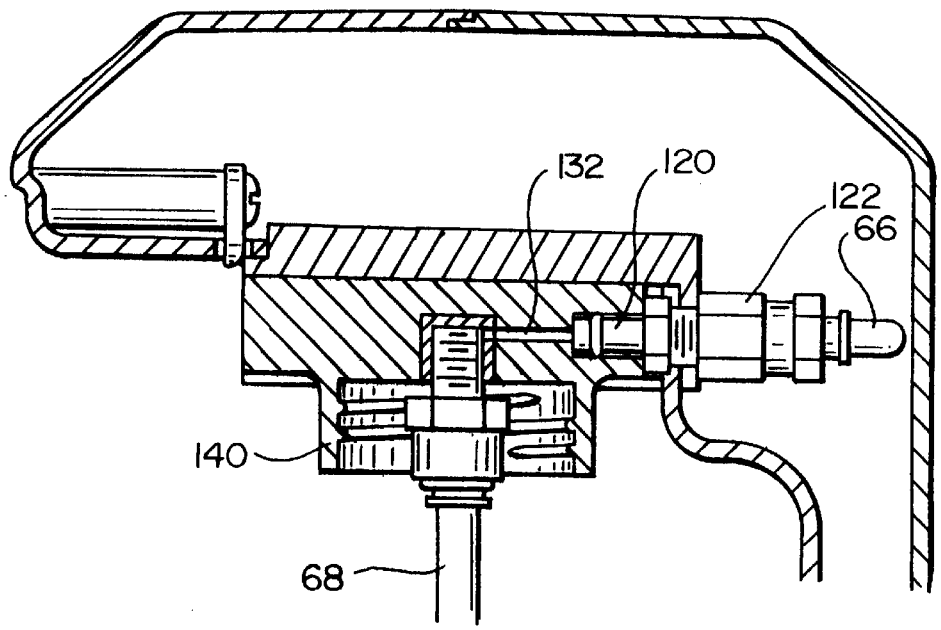
FIG. 10 is a sectional view taken along a vertical plane and showing the injection lid assembly and the lid mounting assembly.
Figure 11:
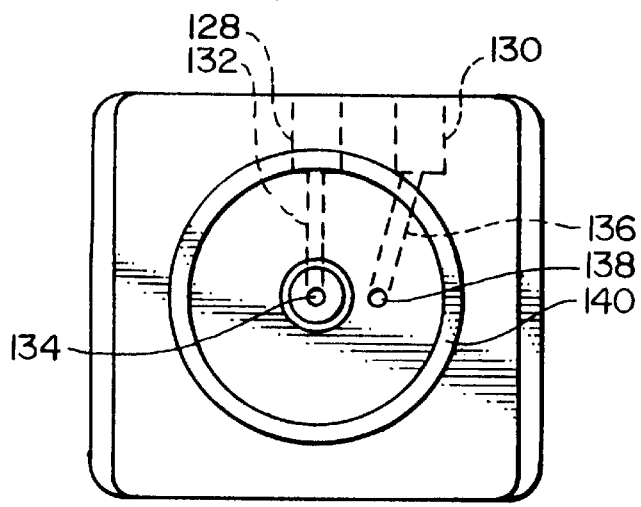
FIG. 11 is a top view looking down on the lid mounting assembly.

The carbon dioxide lid and injector assembly 20 can be seen more clearly in FIGS. 9 through 11. This assembly 20 comprises a mounting plug 108 which has a pair of side flanges 110 so that this plug 108 can be slid into a receptacle block 112, having a top wall 114 and two side walls 116, with the side walls 116 having two longitudinally extending lips 118 to engage the flanges 110 of the block 108.

The pressurizing line 66 and the venting line 46 connect to related fittings 120 and 122, respectively, which in turn lead into male elements 124 and 126 that interfit with related receptacles 128 and 130 in the block 110. As can be seen in FIG. 11 the receptacle 128 leads through a line 132 to discharge pressurized carbon dioxide through an opening 134 into the discharge tube 68. The receptacle 130 connects to a passageway 136 which connects to the vent opening 138. The lower part of the plug member 108 is formed with a closure cap portion 140 which is interiorly threaded at 142 so that this can be screwed onto matching threads 144 at the top of the container 16.

Figure 12:
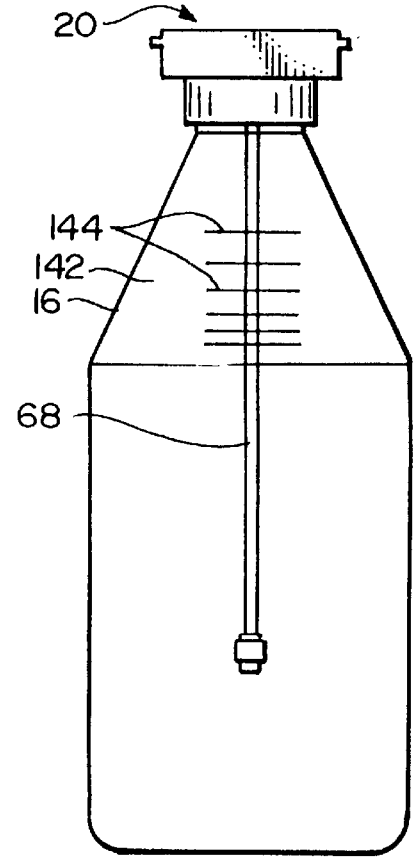
FIG. 12 is a side elevational view showing the water container with the injection lid assembly mounted thereon.

Reference is made to FIG. 12 which shows the container 16 in side elevation. It will be noted that an upper portion 142 of the container 16 tapers upwardly in the form of a truncated cone. There are lateral marking lines 144 on the side of the upper container portion 142 to indicate the level to which the water should be poured into the container 16, depending upon the syrup or other additive which is to be added to the water in the container 16 after it has been carbonated.

Figure 13:
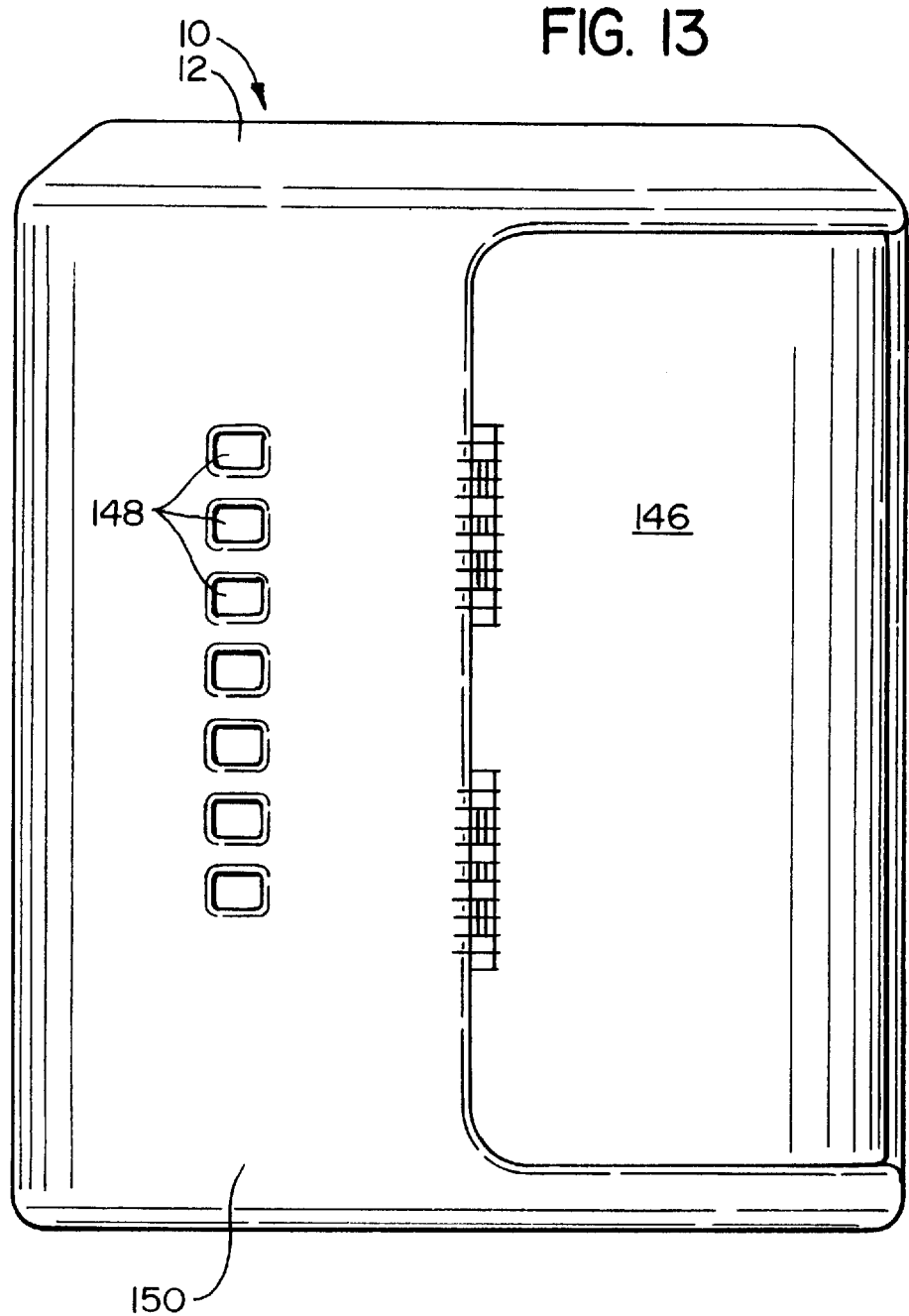
FIG. 13 is a rear elevational view of the apparatus.

FIG. 13 is a rear view of the apparatus 10. There is a rear door 146 through which the pressurized carbon dioxide container can be placed and removed. Also, there are a plurality of plug members 148 mounted to a back wall 150 of the housing 12. In case there is some malfunction, where the interior injecting chamber 24 has become overpressurized, one or more of these doors 148 will blow out to relieve the over pressure.

Figure 14:
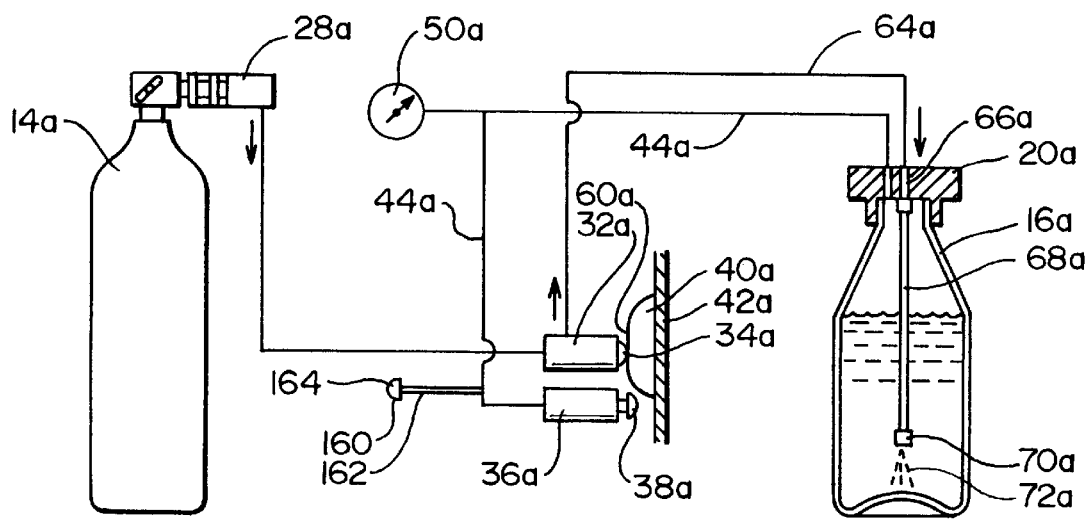
FIGS. 14 through 17 are similar to FIG. 2C, and these show, respectively, a second, third, fourth and fifth embodiment of the present invention, all of which provide venting orifice means.

A second embodiment of the present invention is shown in FIG. 14. Components of the second embodiment which are similar to the first embodiment will be given like numerical designations, with an "a" suffix distinguishing those of this second embodiment.

All of the apparatus disclosed in the description of the first embodiment in FIGS. 1 through 13 is also present in this second embodiment, but for convenience of illustration, all of the components of the first embodiment are not shown in FIG. 14. Rather FIG. 14 shows the apparatus of the second embodiment somewhat schematically as the FIG. 2C, with the addition of the new components of the second embodiment.

Thus, it can be seen that in FIG. 14 there is the pressurized carbon dioxide container 14a, the water container 16a, the pressure control valve 28a, the carbon dioxide lid and injector assembly 20a, the pressurizing valve 32a, the venting valve 36a and the actuating ball elements 34a and 38a.

This second embodiment has (in addition to all of the other components of the first embodiment) a venting orifice member 160 which is connected to the vent line 44a at a location between the vent valve 36a and the lid and injection assembly 20a. A tube 162 is shown connecting the orifice member 160 with the line 44a, and the vent orifice itself is indicated at 164. The effective size of the discharge passageway in the orifice 164 is about the same size as, or moderately smaller than the effective size of the orifice in the injection nozzle 70a. In one arrangement which has been proven to be satisfactory, the diameter of the orifice of the discharge nozzle 70a is 0.020 inches in diameter, while the venting orifice 164 in the vent orifice member 160 is 0.0147 inch in diameter. In another arrangement, the size of the vent orifice is somewhat larger and specifically is 0.0160 inch in diameter. In yet another arrangement the orifice sizes are nearly equal, or the vent orifice 64 could actually be made moderately larger.

The overall operation of this second embodiment of FIG. 14 is substantially the same as described in the first embodiment, in that the bottle 16a is filled with liquid, and the mounting plug 108 of the lid and injector assembly 20 is connected to the top of the bottle 16 and placed in the injection chamber 24.

The door is closed, and the actuating cam member 42*a l is raised to open the pressurizing valve 32a* and cause carbon dioxide to flow through the line 68*a* and through the orifice of the discharge nozzle 70*a*. At this time, the vent valve 36*a* is closed.

As described in the first embodiment, the pressure regulating valve 28*a* reduces the pressure of the carbon dioxide flowing from the container 14*a* to a suitable level, which has been indicated herein as 200 psi. There is possibly an initial 10 psi pressure drop as the carbon dioxide flows through the pressurizing control valve 32*a*, and with the pressure inside the liquid container 16*a* being atmospheric, there is initially a pressure drop of about 190 psi across the orifice in the discharge nozzle 70*a*. The flow rate of the carbon dioxide through the discharge nozzle 70*a* will be dependant upon the pressure level immediately upstream of the orifice in the nozzle 70*a*, and downstream of the orifice in the nozzle 70*a* (i.e. the pressure in the container interior 52). For a gas such as carbon dioxide, if the absolute pressure differential upstream of the nozzle is about twice as great (or moderately greater than twice as great) as the absolute pressure downstream of the nozzle, the flow across the nozzle would be supersonic, and thus rate of flow through the orifice would be dependent solely on the absolute pressure upstream of the orifice in the nozzle 70*a*.

With the pressure regulating valve 28*a* admitting carbon dioxide at a gauge pressure of approximately 200 psi, and with there being a possibly 10 psi pressure drop through the valve 32*a*, the absolute pressure in the line 64*a* and through the tube 68*a* would be approximately 205 psi. Accordingly, the initial flow through the orifice in the nozzle 70*a* would be at its maximum, and would remain substantially constant until the absolute pressure level within the container 16*a* reaches an absolute pressure level possibly in the range of 80 to 110 psi absolute. Then the flow through the orifice of the discharge nozzle 70*a* will become subsonic, and the flow thereafter will be in accordance with the Bernouli's law and continue to decrease as the pressure level rises further in the liquid container 16*a*.

During this time, the vent valve 36*a* is closed. However, as soon as the pressure in the liquid container 16*a* begins to rise above atmospheric, there will be an outflow of carbon dioxide through the line 44*a* and out through the vent orifice 164*a* which leads into an area of atmospheric pressure in the housing 12. Initial flow through this orifice 164 would be in accordance with Bernouli's law, but at the time the pressure of the line 44*a* rises to approximately 15 psi or possibly somewhat moderately higher, the absolute pressure ratio across the orifice 164 would be sufficiently high so that the flow through the orifice 164 becomes supersonic. After that, the magnitude of this flow would be generally in proportion with the pressure in the line 44*a* and the connecting line 162.

During this time period of pressurization, the volumetric flow of the carbon dioxide out of the orifice of the nozzle 70*a* is greater than the outflow through the vent orifice 164, so that the pressure inside the container 16*a* continues to rise. As the pressure in the container continues to rise, the volumetric flow through the orifice in the nozzle 70*a* remains constant, while the pressure in the line in the lines 44*a* and 162 increases so that the flow out the vent orifice 164 increases. As indicated previously, during this time, the vent valve 36*a* is closed. When a predetermined pressure level is reached in the container 16*a*, the pressure differential across the orifice 70*a* has dropped to a sufficiently low level and the pressure drop across the vent orifice 164*a* has risen to a sufficiently high level, so that the volumetric flow through the vent orifice 164 equals (or nearly equals) the volumetric flow through the nozzle 70.

In one preferred design constructed in accordance with the present invention, as shown in FIG. 14, this balance of carbon dioxide flow into the container 16*a* and out the vent orifice 140 is reached when the pressure level in the lines 44*a* has reached 150 psi gauge pressure, as indicated in the pressure gauge 50*a* connected to the line 44*a*. Alternatively, the size of the orifice 164 could be made greater relative to the size of the orifice in the nozzle 70*a* so that the flow through the orifice 164 would be equal to the flow through the orifice in the nozzle at a lower pressure level in the container, so that the water would be pressurized to a lower level (e.g. 80 to 100 psi) to complete the carbonization process. When this occurs, the actuating cam 42*a* is lowered to disengage the pressurizing valve 32*a* (thus closing off further flow of carbon dioxide to the container 16*a*) and the valve control ball member 38*a* is engaged to open the vent valve 36*a*. This causes the pressure in the line 44*a* and in the container 16*a* to drop rather quickly. After this, the container 16*a* is removed from the injection chamber in the apparatus 10*a*, and the lid and injector assembly 20*a* is removed from the bottle 16*a* as in the first embodiment, and the further steps are taken as described with regard to the first embodiment.

Figure 15:
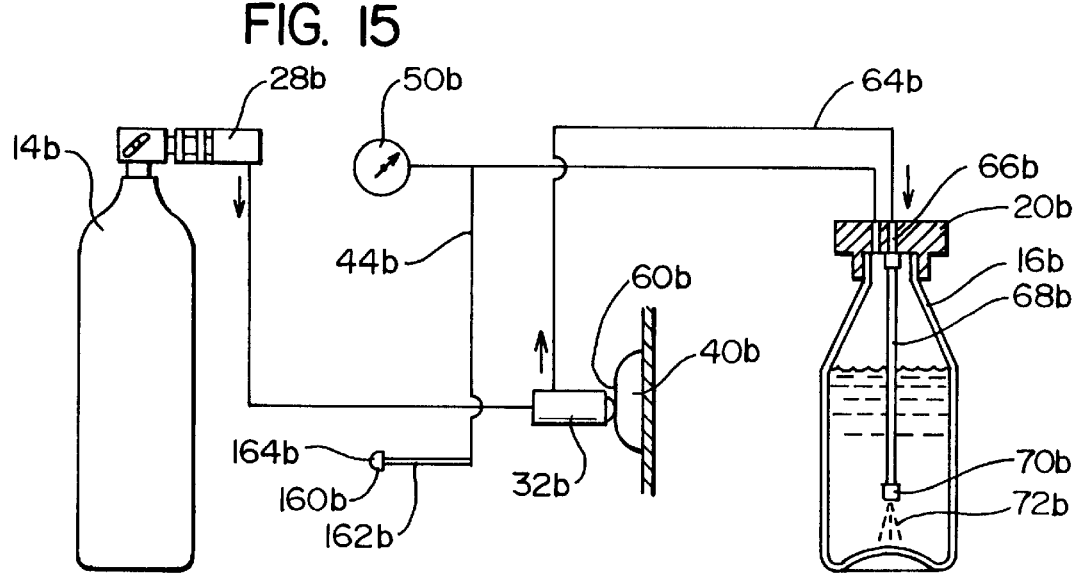

A third embodiment of the present invention is shown in FIG. 15. Components of this third embodiment which are similar to components of the second and first embodiment will be given like numerical designations, with a "b" suffix distinguishing those of the third embodiment. This third embodiment is the same as the second embodiment, except that the vent valve 36*a* has been eliminated. Thus, when the carbonization of the liquid in the container 16*b* has been completed to the extent that the outflow through the vent orifice 164 balances (or nearly balances) the flow of the carbon dioxide through the pressurizing nozzle 70*b*, the actuating cam 40*b* is moved downwardly to close the pressurizing valve 32*b*. With the pressurizing valve 32*b* being closed, the further pressure drop in the container 16*b* would depend solely on the rate of discharge through the vent orifice 164*b*.

This arrangement of the third embodiment is, from an operational view, less desirable than that of the second embodiment, because of the delay in reducing the pressure within the container 16*b*. Also, with this arrangement of the third embodiment of FIG. 15, when the valve actuating member 42*b* is lowered to unlock the door, the container 16*b* would not become immediately depressurized. Accordingly, an alternative interlock mechanism should possibly be provided.

Figure 16:
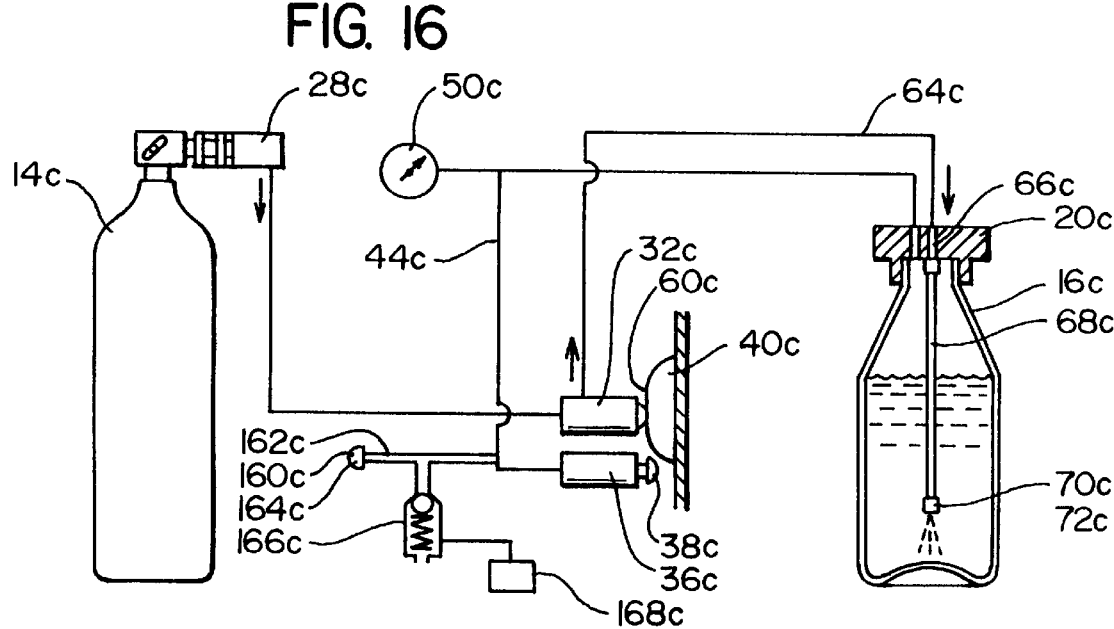

A fourth embodiment is shown in FIG. 16. Components of this fourth embodiment which are similar to components of the first three embodiments will be given like numerical designations, with a "c" suffix distinguishing those of this fourth embodiment. This fourth embodiment is substantially the same as the second embodiment, and thus in addition to the components of the first embodiment, also comprises the vent orifice member 160*c*, a connecting tube 162*c*, and the vent orifice 164*c*. In addition, there is provided a pressure relief valve 166 connecting to the line 162*c*, so as to be in parallel with the vent orifice 164*c*.

This pressure relief valve 166*c* operates, as its name implies, to provide pressure relief in the event of an overpressure in the line 162c. In addition, this pressure relief valve 166 can be provided with an audible signal mechanism (indicated schematically at 168) which is activated when the pressure relief valve 166 moves to its open position. Thus, when the pressure in the container 16c the desired level, the pressure relief valve 166 opens to cause pressurized flow of carbon dioxide through the valve 166 to activate the audible signal mechanism 168.

Figure 17:
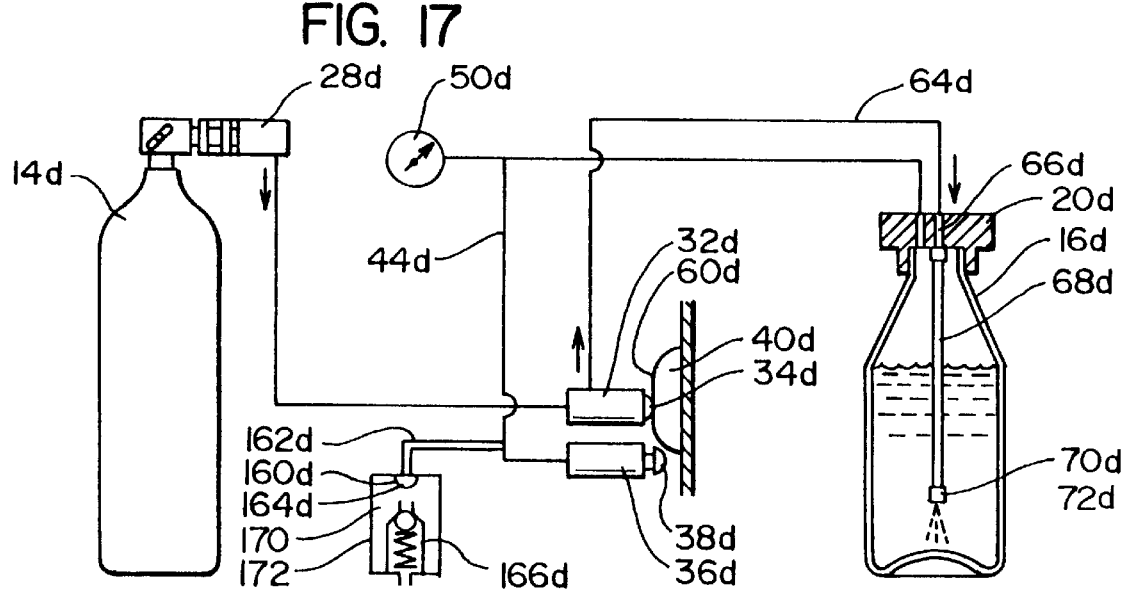

A fifth embodiment is illustrated in FIG. 17. Components of this fifth embodiment which are similar to components previously described herein will be given like numerical designations, with a "d" suffix distinguishing those of the fifth embodiment.

As with the second, third and fourth embodiments, there is provided a vent orifice member 160d with a connecting tube 162d and the vent orifice 164d. As in the fourth embodiment, there is also provided a pressure relief valve 166d.

However, in this fifth embodiment of this FIG. 17, the pressure relief valve 166d is connected in series with the vent orifice member 160d. As shown schematically herein, the vent orifice member 160d discharges the carbon dioxide into the chamber 170 which is defined by an expanded tubular portion 172, having an inlet at which the vent orifice member 160d is positioned, and an outlet at which the pressure relief valve 166d is positioned.

Providing the pressure relief valve 166d in series modifies the operation from what is disclosed in the second, third and fourth embodiments. In this fifth embodiment, the pressure relief valve 166d would be selected so that it opens to atmospheric pressure at a pressure level between atmospheric pressure and the desired end pressure at which the carbonization of the liquid in the container 16d would stop. Thus, for example, if the apparatus 10d is arranged so that the carbonization is to cease when the pressure in the container 16d is 150 psi, the pressure valve 166d could be caused to open at a pressure level of, for example, 75 psi. In this instance, it is surmised that the effective flow area of the vent orifice 164d would be enlarged slightly relative to the effective flow area of the orifice in the pressurizing valve 70d. This will be explained below relating to the operation of this fifth embodiment.

Let it be assumed that the container 16d has been placed in its operating position, and the valve actuating member 42d has been raised to its position to open the pressurizing valve 32d. The carbon dioxide from the container 14d begins to flow into the container 16d, and as the pressure rises in the container 16d, there is flow of carbon dioxide through the line 44d in the connecting line 162d to cause a certain amount of flow through the vent orifice 164d, into the chamber 170d. The chamber 170d is, in FIG. 16, shown much larger than it would actually be, and in an actual operation, the volume of the chamber 170 would be a very small fraction of the volume of the entire container 16, (and actually a small fraction of the volume of the interior chamber of the container that is above the level of the liquid). The effect of this is that the pressure differential across the vent orifice 164d would not need to be very large to cause a sufficient volumetric flow through the orifice 164d to maintain the pressure within the chamber 170 reasonably close to the pressure level in the container 16d.

Let it further be assumed that the vent orifice 14d and the volume of the chamber 170 is such that with the vent relief valve 166d closed, the pressure in the chamber 170d rises to 75 psi gauge pressure at such time as the pressure in the container 16b rises to, for example, 80 or 85 psi. At this time, the pressure relief valve 166d would open, and provide a flow discharge passage having an effective cross sectional flow area many times greater than that of the orifice 164d.

The effect of this is that as the pressure in the container 16d keeps rising, and the pressure drop across the vent orifice 164d keeps rising, the pressure in the chamber 170 rises very little. From this point on, the apparatus of this fifth embodiment of FIG. 17 is operating in substantially the same manner as the second embodiment of FIG. 14, except that instead of venting the orifice 164 of the second embodiment to atmosphere, the present embodiment vents the orifice 164d to a chamber at an intermediate level between atmospheric and the pressure in the container 16d.

It is to be recognized that various modification could be made without departing from the basic teachings of the present invention.

What is claimed:

1. An apparatus for making a carbonated beverage, comprising:

a. a housing structure having a first section at which a source of pressurized carbon dioxide can be positioned, and a second section defining a chamber to receive a liquid container therein;

b. a pressurized valve means comprising pressure control means to receive said pressurized carbon dioxide at a higher pressure level from said source of said carbon dioxide and reduce the pressure of the carbon dioxide to a predetermined lower pressure level, and pressurizing valve means having a closed position and an open position to deliver said carbon dioxide at said predetermined lower pressure level to said second section of the housing structure;

c. a pressurizing nozzle means arranged to be positioned in said second section to receive the pressurized carbon dioxide from the pressurizing valve means and discharge the pressurized carbon dioxide into a liquid in a container in said second housing section;

d. a vent valve means having a closed position and an open position, and arranged to be connected to the liquid container to receive pressurized carbon dioxide from the liquid container;

e. valve actuating means arranged to be moveable between a pressurizing position to open said pressurizing valve to deliver carbon dioxide to said nozzle means, and a venting position to open said vent valve means to enable pressurized carbon dioxide in said container to flow to a lower pressure area and f. said nozzle means comprising a pressurizing orifice means through which pressurized carbon dioxide is transmitted into said container, said apparatus further comprising vent orifice means defining a vent orifice arranged to be operably connected to the liquid container to receive pressurized carbon dioxide from said liquid container and discharge said carbon dioxide to a lower pressure area, in a manner that during the time period that pressurized carbon dioxide flows through said pressurizing orifice means and through said liquid in the container to accomplish carbonation of liquid in the container carbon dioxide flows from said container through said vent orifice means to extend a time period during which the carbon dioxide is flowing through the liquid in the container.

2. The apparatus as recited in claim 1, wherein said vent orifice means has an effective orifice discharge opening area smaller than an effective orifice discharge opening area of said pressurizing orifice, so that gaseous flow through said vent orifice means is more restricted than gaseous flow through said pressurizing orifice means.

3. The apparatus as recited in claim 1, wherein said vent orifice means has an effective orifice discharge opening area at least as great as an effective orifice discharge opening area of said pressurizing orifice, so that gaseous flow through said vent orifice means is no more restricted than gaseous flow through said pressurizing orifice means.

4. The apparatus as recited in claim 1, further comprising pressure relief check valve means which is operably connected to a passageway interconnecting said vent orifice means with said liquid container.

5. The apparatus as recited in claim 4, wherein pressure relief valve means is connected to carbon dioxide flow from said container to said vent orifice means and in parallel with said vent orifice means to maintain pressure of carbon dioxide upstream of said vent orifice means below a predetermined upper level.

6. The apparatus as recited in claim 4, wherein said pressure relief valve means is operably connected to a flow of carbon dioxide from said vent orifice means to maintain a predetermined pressure level of carbon dioxide above atmospheric pressure downstream of said vent orifice means.

7. The apparatus as recited in claim 1, wherein the pressurizing valve means of said pressurized valve means, the vent valve means and the valve actuating means are mounted to said housing structure and said valve actuating means has a first interlock means mounted thereto so as to be moveable with movement of said valve actuating means between the pressurizing position and the venting position, said apparatus further comprising a door which is moveable to an open position to permit access to said chamber and a closed position closing said chamber, said door having second interlock means which is in an interlock position when said door is closed, the first interlock means being arranged in a manner that when the valve actuating means is in the venting position, the first interlock means and the door interlock means are out of interlocking engagement, and when the valve actuating means is moved to the pressurizing position, the first interlock means and the door interlock means come into locking engagement, said apparatus further comprising valve actuating stop means having a blocking position to prevent movement of said valve actuating means to the pressurizing position, said door being provided with valve actuating release means to remove said stop means from its blocking position to permit said valve actuating means to move to the pressurizing position when the door is closed.

8. The apparatus as recited in claim 7, wherein the pressurizing valve means of said pressurized valve means, the vent valve means and the valve actuating means are mounted to said housing structure and said valve actuating means has a first interlock means mounted thereto so as to be moveable with movement of said valve actuating means between the pressurizing position and the venting position, said apparatus further comprising a door which is moveable to an open position to permit access to said chamber and a closed position closing said chamber, said door having second interlock means which is in an interlock position when said door is closed, the first interlock means being arranged in a manner that when the valve actuating means is in the venting position, the first interlock means and the door interlock means are out of interlocking engagement, and when the valve actuating means is moved to the pressurizing position, the first interlock means and the door interlock means come into locking engagement, said door having an edge portion which is arranged so that when the door is moved into the closed position, the door edge portion is adjacent to a housing structure portion, the first interlock means and the door interlock means being positioned operably adjacent to said housing structure edge portion and said door edge portion so as to come in interlocking relationship when the door is closed and the valve actuating means is moved to the pressurizing position.

9. The apparatus as recited in claim 1, wherein there is a receptacle block means mounted at the second section of the housing structure, and a container plug means having connecting means enabling said plug means to be removably connected to the liquid container to form a pressure tight seal therewith, said plug means having a pressurizing and venting opening means, leading to an interior of the container, and pressurizing and venting connecting means, said receptacle block means having operative passageway connections to said pressurizing valve means and said vent valve means and said pressurizing and venting connecting means, said connecting plug means being arranged to be moved while connected to said container, into operative connecting engagement with said receptacle block means, with the pressurizing and venting connecting means of the plug means and the block means coming into operating engagement so that said plug means is interconnecting with said pressurizing valve means and said vent valve means when in the engaged position with the receptacle block means, whereby said pressurizing valve means and said vent valve means can be in operative engagement with said liquid container when the liquid container is positioned in the chamber and the plug member, connected to the liquid container, is in interconnecting engagement with the receptacle block means.

10. The apparatus as recited in claim 9, wherein said mounting plug means has an injection tube means extending from the mounting plug means so as to be positioned at a lower location in said container whereby pressurized gas can flow from the pressurizing tube means through the receptacle block means and mounting plug means and through the injection tube means to discharge carbon dioxide into the container, and gas in the liquid container can flow through interconnecting passageway means and to the vent valve means.

11. An apparatus for making a carbonated beverage, comprising:

a. a housing structure having a first section arranged to provide a source of pressurized carbon dioxide and a second section defining a chamber to receive a liquid container therein;

b. a pressurizing valve means having a closed position and an open position to deliver said carbon dioxide to said second section of the housing structure;

c. a pressurizing nozzle means arranged to be positioned in said second section to receive the pressurized carbon dioxide from the pressurizing valve means and discharge the pressurized carbon dioxide into a liquid in a container in said second housing section;

d. a vent valve means having a closed position and an open position, and arranged to be connected to the liquid container to receive pressurized carbon dioxide from the liquid container;

e. valve actuating means arranged to be moveable between a pressurizing position to open said pressurizing valve to deliver carbon dioxide to said nozzle means, and a venting position to open said vent valve means to enable pressurized carbon dioxide in said container to flow to a lower pressure area;

f. the pressurizing valve means, the vent valve means and the valve actuating means being mounted to said housing structure and said valve actuating means having a first interlock means mounted thereto so as to be moveable with movement of said valve actuating means between the pressurizing position and the venting position, said apparatus further comprising a door which is moveable to an open position to permit access to said chamber and a closed position closing said chamber, said door having second interlock means which is in an interlock position when said door is closed, the first interlock means being arranged in a manner that when the valve actuating means is in the venting position, the first interlock means and the door interlock means are out of interlocking engagement, and when the valve actuating means is moved to the pressurizing position, the first interlock means and the door interlock means come into locking engagement and g. said apparatus further comprising valve actuating stop means having a blocking position to prevent movement of said valve actuating means to the pressurizing position, said door being provided with valve actuating release means to remove said stop means from its blocking position to permit said valve actuating means to move to the pressurizing position when the door is closed.

12. The apparatus as recited in claim 11, wherein said door has an edge portion which is arranged so that when the door is moved into the closed position, the door edge portion is adjacent to a housing structure portion, the first interlock means and the door interlock means being positioned operably adjacent to said housing structure edge portion and said door edge portion so as to come in interlocking relationship when the door is closed and the valve actuating means is moved to the pressurizing position.

13. The apparatus as recited in claim 11, wherein there is a receptacle block means mounted at the second section of the housing structure, and a container plug means having connecting means enabling said plug means to be removably connected to the liquid container to form a pressure tight seal therewith, said plug means having a pressurizing and venting opening means, leading to an interior of the container, and pressurizing and venting connecting means, said receptacle block means having operative passageway connections to said pressurizing valve means and said vent valve means, and pressurizing and venting connecting means, said mounting plug means being arranged to be moved while connected to said container, into operative connecting engagement with said receptacle block means, with pressurizing and venting connecting means of the plug means and the block means coming into operating engagement so that said plug means is interconnecting with said pressurizing valve means and said vent valve means when in the engaged position with the receptacle block means, whereby said pressurizing valve means and said vent valve means can be in operative engagement with said liquid container when the liquid container is positioned in the chamber and the plug member, connected to a liquid container, is in interconnecting engagement with the receptacle block means.

14. The apparatus as recited in claim 13, wherein said mounting plug means has an injection tube means extending from the mounting plug means so as to be positioned at a lower location in said container whereby pressurized gas can flow from the pressurizing tube means through the receptacle block means and mounting plug means and through the injection tube means to discharge carbon dioxide into the container, and gas in the liquid container can flow through interconnecting passageway means and to the vent valve means.

15. The apparatus as recited in claim 13, wherein said valve actuating means has liquid container interlock means, arranged so that when the valve actuating means is in the pressurizing position, the container interlock means comes into operative engagement with the container with the mounting plug means mounted thereto to retain said liquid container in the chamber.

16. A method of making a carbonated beverage, comprising:

a. providing a source of pressurized carbon dioxide which is at a first higher pressure level and which is connected through pressurizing valve means to a discharge nozzle means;

b. positioning said nozzle in a water container, and opening said pressurizing valve means to cause pressurized carbon dioxide to flow from said source through the nozzle means into water in the container so that some of said carbon dioxide becomes dissolved in the water, with flow rate of the carbon dioxide being sufficiently great to cause pressure in said water container to rise;

c. while said carbon dioxide is being discharged into said water container, directing carbon dioxide from said water container to an orifice vent means leading to a lower pressure area, to cause carbon dioxide to be discharged through said orifice vent means to said lower pressure area;

d. continuing to discharge the carbon dioxide into the water in the container to cause pressure level in the container to increase, while continuing to discharge carbon dioxide through the orifice vent means at an increasing volumetric flow rate due to pressure rise in the container;

e. closing said pressurizing valve means and removing said water container from the nozzle means and the orifice vent means.

17. The method as recited in claim 16, wherein said orifice means is substantially continuously open so that there is a substantially continuous flow of carbon dioxide therethrough at a rate related to pressure differential across said vent orifice means.

18. The method as recited in claim 16, further comprising providing vent valve means which is operatively connected to said water container, and opening said vent valve means after completion of dissolving carbon dioxide to reduce pressure in the container to near atmospheric or to atmospheric level.

19. The method as recited in claim 18, wherein said vent valve means is open to atmospheric or near atmospheric pressure.

20. The method as recited in claim 16, further comprising permitting pressure in the container to decline to near atmospheric or atmospheric level after closing said pressurizing valve means by carbon dioxide flowing through said vent orifice means.

21. The method as recited in claim 16, wherein pressure relief valve means is connected to a high pressure side of said vent orifice means to cause a portion of the carbon dioxide flow from said container to bypass said vent orifice means and flow through said pressure relief valve means when a predetermined relief pressure level is reached.

22. The method as recited in claim 21, wherein signaling or alarm means is connected to said pressure relief valve means and causes a signal or alarm to be initiated when said predetermined relief pressure level is reached.

23. The method as recited in claim 16, wherein pressure responsive valve means is provided at a low pressure side of the vent orifice means, to open at a predetermined pressure level, and with said predetermined pressure level being reached at said orifice means the pressure responsive valve opens to cause flow through said vent orifice means.

24. The method as recited in claim 16, wherein said nozzle means comprises a discharge orifice means, and said vent orifice means and said discharge orifice means are each substantially constantly open during a cycle of passing carbon dioxide through said water, and the pressurized carbon dioxide is delivered to the discharge orifice means at a sufficiently high pressure and said vent orifice means is at a sufficiently low pressure on its upstream side so that pressure drop across said discharge orifice means into said container is initially supersonic for a first period of flow, while flow through said vent orifice means is initially subsonic for said first period of flow, and after said first period of flow, pressure upstream of said vent orifice means is sufficiently high to become supersonic for a second period of flow.

25. The method as recited in claim 24, wherein after said second period of flow, the pressure in the container reaches a sufficiently high level so that flow through the discharge orifice means becomes subsonic, while flow through the vent orifice means remains supersonic.

26. The method as recited in claim 25, further comprising directing said pressurized carbon dioxide from the source through a pressure control valve means to cause carbon dioxide to be delivered to said nozzle means at a controlled pressure level within predetermined pressure limits.

27. The method as recited in claim 16, when there is provided an aerating apparatus having a first section containing said source of carbon dioxide and a second section containing said water container, said method further comprising directing said pressurized carbon dioxide from said source through a pressure control valve means to deliver carbon dioxide to said nozzle means at a controlled pressure level within predetermined pressure limits, and said vent orifice means is substantially constantly open during operation of said apparatus so that there is a substantially continuous flow of carbon dioxide therethrough at a rate related to pressure differential across said vent orifice means, said method further comprising providing said container as a beverage container and filling said container with water to a level below a top opening of said container to leave a relatively small volume at the upper part of said container without water, so that an additive can be added to the water in the container after the carbon dioxide has been added to the water.

28. The method as recited in claim 27, wherein said nozzle means comprises a discharge orifice means, and said vent orifice means and said discharge orifice means are each substantially constantly open during operation of the method, and the pressurized carbon dioxide is delivered to the discharge orifice means at a sufficiently high pressure and said vent orifice means is at a sufficiently low pressure on its upstream side so that pressure drop across said discharge orifice means into said container is initially supersonic for a first period of flow, while flow through said vent orifice means is initially subsonic for said first period of flow, and after said first period of flow, pressure upstream of said vent orifice means is sufficiently high to become supersonic for a second period of flow.

29. The method as recited in claim 28, wherein after said second period of flow, the pressure in the container reaches a sufficiently high level so that flow through the discharge orifice means becomes subsonic, while flows through the vent orifice means remains supersonic.

30. A method of making a carbonated beverage comprising:
   a. providing an aerating apparatus comprising:
      i. a housing having a front side and a rear side, and having a first section containing a source of carbon dioxide and a second section having a chamber to receive a water container;
      ii. said housing having a forward facing access opening located at a front part of said second section to permit a water container to be inserted through said access opening into said chamber and to be removed from said chamber through said access opening;
      iii. a door which is positioned at said front access opening and which has a mounting edge portion by which the door is swing-mounted to the housing to be moved between an open and closed position, said door having a free edge portion which, with the door in the closed position is adjacent to an adjacent edge portion of the housing which is next to the access opening,
   b. providing a valve means comprising a pressurizing valve means having a pressurizing valve actuating means to move the pressurizing valve means between open and closed positions, and a vent valve means having a vent actuating means to move the vent valve means between open and closed positions;
   c. opening said door, inserting the water container with water therein into the chamber, and closing said door;
   d. moving a valve and interlock actuating means along an actuating path which is proximate to the free edge of the door in its closed position and proximate to the adjacent edge portion of the housing, said actuating path having a substantial path component of travel which is parallel to a plane which passes through a plane occupied by the free edge of the door in its closed position:
      i. to cause a valve actuating portion of said valve and interlock actuating means to move from a venting position where it was engaging the vent valve actuating means to maintain said vent valve means in an to a pressurizing position to permit the vent valve means to close and to engage the pressurizing valve actuating means to open the pressurizing valve means;
      ii. to move a first interlock means of said valve and interlock actuating means from a first non-interlocking position to a second interlock position where the first interlock means is positioned to engage a second interlock means of the door to prevent opening of the door;
   e. after a flow of carbon dioxide into the container has occurred for a desired period, moving said valve and interlock actuating means back to the first position to cause said pressurizing valve means to move to the closed position, and to cause the vent valve means to move to the open position, and also to move the first interlock means back to the first non-interlock locking position; and
   f. opening the door and removing the container from the chamber of the second section.

31. A method of making a carbonated beverage comprising:
   a. providing an aerating apparatus comprising a housing having a front side and a rear side and having a first section containing a source of pressurized carbon dioxide and a second section having a chamber to receive a water container;

b. providing a valve means comprising pressurizing valve means to deliver pressurized carbon dioxide from said source to said water container, and vent valve means to vent carbon dioxide from said water container;

c. providing in said chamber a receptacle block means having a vent connecting means operatively connected to said vent valve means, and a pressurizing connecting means operatively connected to pressure valve means;

d. connecting a pressure tight container plug means to an opening of the container having water therein to close the container, said plug means having a vent connector which opens to the inside of the container and a pressure connector which opens at the inside of the container, and also providing nozzle discharge means leading from the pressure connector to discharge carbon dioxide into water in the container;

e. inserting the container with the plug means connected thereto into the chamber and causing the plug means to come into engagement with the receptacle block means to cause the vent connector and the pressure connector of the receptacle block means to come into engagement with vent connector and the pressure connector of the container plug means;

f. operating the valve means to first deliver pressurized carbon dioxide through said receptacle block means and the containing plug means to cause discharge of carbon dioxide into the water in the container, and then to vent carbon dioxide from the container through the container plug means and the receptacle block means to the vent valve means;

g. removing the container from the chamber and disconnecting the containing plug means from the container.

\* \* \* \* \*